US009769565B2

United States Patent
Fedosov et al.

(10) Patent No.: US 9,769,565 B2
(45) Date of Patent: Sep. 19, 2017

(54) METHOD FOR PROCESSING DATA FOR THE ESTIMATION OF MIXING PARAMETERS OF AUDIO SIGNALS, MIXING METHOD, DEVICES, AND ASSOCIATED COMPUTERS PROGRAMS

(71) Applicants: B<>COM, Cesson, Sevigne (FR); Orange, Paris (FR)

(72) Inventors: Andrey Fedosov, Rennes (FR); Jerome Daniel, Penvenan (FR); Gregory Pallone, Rennes (FR)

(73) Assignees: B<>COM, Cesson Sevigne (FR); ORANGE, Paris (FR)

( * ) Notice: Subject to any disclaimer, the term of this patent is extended or adjusted under 35 U.S.C. 154(b) by 0 days.

(21) Appl. No.: 15/091,315

(22) Filed: Apr. 5, 2016

(65) Prior Publication Data
US 2016/0302005 A1    Oct. 13, 2016

(30) Foreign Application Priority Data

Apr. 10, 2015  (FR) ...................... 15 53164
Jul. 28, 2015   (FR) ...................... 15 57214

(51) Int. Cl.
*H04R 3/00*   (2006.01)
*H04R 5/00*   (2006.01)
(Continued)

(52) U.S. Cl.
CPC ............ *H04R 3/005* (2013.01); *G06F 17/15* (2013.01); *G10L 19/008* (2013.01); *H04R 5/027* (2013.01);
(Continued)

(58) Field of Classification Search
CPC ............ G06F 17/15; G10L 19/008; H04R 2430/20; H04R 29/005; H04R 3/005; H04R 5/027;
(Continued)

(56) References Cited

U.S. PATENT DOCUMENTS 7,333,622 B2 *  2/2008  Algazi .................... H04S 7/304
                                                          367/125
9,396,731 B2 *  7/2016  Herre ...................... G10L 19/02
(Continued)

FOREIGN PATENT DOCUMENTS

WO   2012105885 A1   8/2012
WO   2014204999 A2   12/2014

OTHER PUBLICATIONS

John Nettingsmeier, "Field Report: A pop production in Ambisonics", Proceedings of the linux audio conference 2010, May 2010, pp. 1-7, Utrecht, The Netherlands.
(Continued)

*Primary Examiner* — Khai N Nguyen
(74) *Attorney, Agent, or Firm* — David D. Brush; Westman, Champlin & Koehler, P.A.

(57) ABSTRACT

A method and apparatus are provided for processing data for estimating mixing parameters of at least one audio spot signal captured by a sound recording device, called a spot microphone, arranged in the vicinity of a source among a plurality of acoustic sources constituting a sound scene, and a primary audio signal captured by an ambisonic sound recording device, arranged to capture said plurality of acoustic sources of the sound scene.

19 Claims, 9 Drawing Sheets

(51) Int. Cl.
*G06F 17/15* (2006.01)
*G10L 19/008* (2013.01)
*H04R 29/00* (2006.01)
*H04S 3/00* (2006.01)
*H04S 7/00* (2006.01)
*H04R 5/027* (2006.01)

(52) U.S. Cl.
CPC ........ *H04R 29/005* (2013.01); *H04R 2430/20* (2013.01); *H04S 3/008* (2013.01); *H04S 7/301* (2013.01); *H04S 2400/15* (2013.01); *H04S 2420/11* (2013.01)

(58) Field of Classification Search
CPC .. H04S 2400/15; H04S 2420/11; H04S 3/008; H04S 5/00; H04S 7/301
USPC .......................................................... 381/92
See application file for complete search history.

(56) References Cited

U.S. PATENT DOCUMENTS

| | | | | |
|---|---|---|---|---|
| 9,502,046 | B2* | 11/2016 | Purnhagen | G10L 19/008 |
| 2004/0076301 | A1* | 4/2004 | Algazi | H04S 7/304 |
| | | | | 381/17 |
| 2012/0288114 | A1* | 11/2012 | Duraiswami | H04R 1/406 |
| | | | | 381/92 |
| 2013/0142342 | A1* | 6/2013 | Del Galdo | H04R 3/005 |
| | | | | 381/56 |
| 2013/0259243 | A1* | 10/2013 | Herre | G10L 19/02 |
| | | | | 381/57 |
| 2014/0025386 | A1* | 1/2014 | Xiang | G10L 19/008 |
| | | | | 704/500 |
| 2015/0110310 | A1* | 4/2015 | Minnaar | H04R 5/00 |
| | | | | 381/307 |
| 2015/0221313 | A1* | 8/2015 | Purnhagen | G10L 19/008 |
| | | | | 704/500 |
| 2015/0271621 | A1* | 9/2015 | Sen | H04S 7/30 |
| | | | | 381/303 |
| 2016/0142851 | A1* | 5/2016 | Sun | H04R 29/002 |
| | | | | 381/20 |

OTHER PUBLICATIONS

Matthias Frank et al., "Producing 3D Audio in Ambisonics", Aes 57th international conference, Mar. 6, 2015, pp. 1-8, Hollywood, USA.
Chris Baume et al., "Scaling new heights on broadcasting using ambisonics", Proc. of the 2nd international symposium on ambisonics and spherical acoustics, May 6, 2010, pp. 1-9, Paris, France.
Kearney Gavin et al., "Virtual vs Actual Multichannel Acoustical Recording", 124th AES Convention, May 17-20, 2008, AES, New-York, USA.
French Search Report and Written Opinion dated Feb. 26, 2016 for corresponding French Application No. 1553164, filed Apr. 10, 2015.
European Search Report and Written Opinion dated Jul. 29, 2016 for European Application No. 16163473.
J. Daniel et al., "Further study of Sound Field Coding with Higher Order Ambisonics", published in the proceedings of the conference 116th AES Convention in 2004.
R.W. Schafer et al, A Digital Signal Processing Approach to Interpolation, published in the proceedings IEEE, vol. 61, No. 6, pp. 692-702, in Jun. 1973.
Ventzas et al., "Peak Searching Algorithms and Applications", SIPA 2011.
M. A. Gerzon, "Periphony: With-Height Sound Reproduction" published in the Journal J.Audio Eng. Soc., vol. 21, No. 1, pp. 2-10, in Feb. 1973.
English translation of the European Written Opinion dated Jul. 29, 2016 for European Application No. 16163473.

* cited by examiner

METHOD FOR PROCESSING DATA FOR THE ESTIMATION OF MIXING PARAMETERS OF AUDIO SIGNALS, MIXING METHOD, DEVICES, AND ASSOCIATED COMPUTERS PROGRAMS

1. FIELD OF THE DISCLOSURE

The disclosure relates to the field of sound recording and associated audio processing technologies.

The disclosure may in particular, but not exclusively, apply the mixing of acoustic signals respectively stemming from a primary ambisonic sound recording device and with at least one spot sound recording device, implemented for the capture of a three-dimensional sound scene.

2. BACKGROUND

The term "mixing" or simply "mix" refers to a set of processing operations of audio signals, performed by software or by a device, at the end of which all the signals are mixed to obtain a unified sound in regulating the sound level, the tone, the spatialization and other sound characteristics. In general, this sound is made up of several signals and broadcast on several speakers distributed in auditory space (or headset), in order to create an image of a sound scene where one can perceive localized sound sources in angle and in depth (i.e. the "stereo", in the broad sense). The stage of "mixing", conducted by example in a recording studio, is an integral part in the production of music, films, radio and television.

In a classic design f its sound scene, the capture of it consists in the use of a primary microphone system which provides a sound image of the overall scene while providing the "color" and the "volume" of the space. Often, each microphone system picks up a signal which is then reconstructed on a dedicated loudspeaker. The resulting sound image and its location depend on amplitude and/or phase differences between the signals broadcast by the different speakers. To improve the perceived quality of the important acoustic sources, the sound recorder of spot microphones, arranged in close proximity to the sources in question.

The capture of the more widespread sound field is based on a sound recording using microphonic pairs for a stereophonic reproduction on two speakers. The principles of such a capture date back to the 1930s. The evolution of the systems of reproduction towards a greater number of speakers (quadriphonic, multichannel) to add an immersive dimension, led to the creation of new systems of sound recording, rational and able to operate immediately with several channels.

We have today microphonic systems composed of several capsules arranged to capture the sound field in several dimensions (typically 2 or 3) according to a so-called "ambisonic" technology. The "ambisonic" technology is for example described in the article by M. A. Gerzon, entitled "Periphony: With-Height Sound Reproduction and published in the journal *J. Audio Eng. Soc.*, vol. 21, no. 1, pp. 2-10, in February 1973.

The ambisonic approach is to represent the characteristics of a sound field from spherical first order harmonics in a point which corresponds to the position of the microphone, and which will, when reproduced, to the position of the listener. The order-1 of this format describes the sound field using the four components which contain spatial information (azimuth, elevation) as well as the sound characteristics such as:

the height, which perceive a sound as more or less high-pitched;
the duration, the time of resonance and maintenance of a sound;
the intensity, the volume, the strength of a sound;
the tone, the "color" of a sound.

In relation to FIG. 1A, every point of the Euclidean space in three dimensions is defined with the 3 following parameters:

azimuth $\theta$
elevation $\phi$
radius r

The Cartesian coordinates of a point in the space (x, y, z) are expressed from spherical coordinates (r, $\theta$, $\phi$) in the following manner:

$$\begin{cases} x = r \cdot \cos\theta \cdot \cos\varphi \\ y = r \cdot \sin\theta \cdot \cos\varphi \\ z = r \cdot \sin\varphi \end{cases} \quad (1)$$

In relation to FIG. 1b, to capture the first order HOA, Michael Gerzon has proposed to use an omnidirectional microphone producing a so-called pressure component w, coupled to three bi-directional microphones, producing the components X, Y, z, which are oriented along orthogonal axes. The 3D sound space is then picked up by the combination of the "omni" microphone providing the corresponding signal to the component W) and bi-directional microphones providing the corresponding signals to the components X, Y, Z. The whole of the four components captured by this type of device is called Format B or in other words the order-1 of the HOA format for "Higher Order Ambisonic". This HOA format is seen as a generalization of the ambisonic to superior sequences allowing to increase the spatial resolution of the sound field.

Other types of microphones exist, using alternative directivity capsules, and for which a mastering (of gains or filters) is necessary in order to obtain the ambisonic components. It should be noted that a minimum of 3 capsules in 2 dimensions, and 4 capsules in 3 dimensions is necessary. This is for example the case of the Soundfield® microphone which uses 4 quasi-coincident cardioid capsules and which allows to provide, after mastering, the 4 signals of format B, or again the case of the microphone Eigenmike® which has 32 capsules distributed on a rigid sphere of 8.4 cm diameter and which allows provision of, after conversion, the 25 signals of the order-4 HOA format.

The spot microphones are generally of directive monophonic capsules, directed to the sources to capture, but it is possible to use a stereophonic microphone (or a couple). The advantage of a stereophonic microphone is that it allows you to capture a local sound space, for example the one formed by the different instruments of an orchestral podium of classical music while maintaining their relative positions, or even the "overhead" of drums (atmospheric microphones overhead of a drummer, which allows you to capture the relative positioning of the toms or cymbals).

Later in the document, we will restrict, without loss of generality, to the format B, that is to say order-1 HOA format and with monophonic spot microphones.

We consider an acoustic source whose position with respect to the origin is described by the vector unit $\vec{u}(u_x, u_y, u_z)$. Its 4 components according to format B is expressed in the following form:

$$\begin{cases} W = s \\ X = \eta \cdot s \cdot u_x \\ Y = \eta \cdot s \cdot u_y \\ Z = \eta \cdot s \cdot u_z \end{cases} \quad (2)$$

where η is a normalization factor introduced by Gerzon to retain the level of amplitude of each component.

The ambisonic technology adapts to different systems of reproduction, allows for manipulation of the sound field (rotation, focalization, . . . ) and is based on powerful mathematical formalism.

The combined use of "ambisonic" capsule microphones with spot microphones opens new possibilities for sound recording, but demands the production of new tools that allow to manipulate the sound field in the HOA format as well as to integrate in the mixing process all the acoustic sources captured by spot microphones.

A "plug-in" software device, marketed under the name of PanNoir by the company Merging Technologies, is able to perform a spatial positioning (or "pan-pot") of spot microphones before mixing the acoustic signals that they have picked up with those of a primary two-capsule microphone. The user must manually adjust the distance (therefore the overall delay) and the relative position of spot microphones to the primary microphone, as well as the characteristics of the latter (spacing, orientation and directivity of 2 capsules), and the "plug-in" will simply calculate the delays and gains to apply to each spot capsule. In the case of a primary microphone coinciding, i.e. to collocated capsules and a monophonic spot, the delay is not calculated automatically, but provided by the user.

3. DISADVANTAGES OF THE PRIOR ART

The estimation of the parameters for the mixing of audio signals picked up for same sound scene by a primary microphone and at least one spot microphone is in large part carried out manually by the sound engineer, a long and tedious task indeed, which often leads to an approximate result.

4. SUMMARY

An aspect of the present disclosure relates to a method of processing data for the estimation of mixing parameters of at least one audio spot signal captured by a sound recording device, so-called spot microphone, arranged in the vicinity of a source among a plurality of acoustic sources constituting a sound scene, and a primary audio signal captured by a sound recording device, arranged to capture said plurality of acoustic sources of the sound scene, said primary audio signal being encoded in a so-called "ambisonic" format, comprising at least one component (W) and three omni-directional components (X, Y, Z) projected bidirectionally along orthogonal axes of a referential of the primary microphone, said method comprising the following steps, implemented for a frame of the primary audio signal and a frame of said spot signal, and frame comprising at least one block of N samples:

Estimation of a delay between the omnidirectional component of the frame of the primary audio signal and the frame of said spot signal, from at least one block of N samples of one of the two frames, so-called block of reference, associated with a predetermined moment of acquisition, and an observation area of the other frame, so-called observation area, comprising at least one block of N samples and formed in vicinity of the moment of acquisition, by maximizing a measurement of similarity between the block of reference and a block of the observation area, so-called block of observation, temporally offset by the delay with respect to the block of reference; and Estimation of at least one angular position of the source captured by said spot microphone in a referential of the primary microphone by calculation of a ratio between a first scalar product of a block of audio spot signal associated with the predetermined moment of acquisition and of a first component of the block of the primary audio signal temporally offset by the estimated delay and a second scalar product of same block of the audio spot signal and of the block of a second component of the primary audio signal temporally offset by the estimated delay.

It is assumed that the spot microphone is placed in close proximity of a particular acoustic source. This source emits an acoustic signal which is picked up by the spot microphone with a first delay which depends on a distance between the spot microphone and this source. This signal is also picked up by the primary microphone with a second delay which depends on the distance between the source and the primary microphone.

An aspect of the disclosure proposes to estimate the actual delay between the two signals by looking for similar blocks temporally offset. This delay corresponds to the difference between the second and the first delay. It is linked to the apparent position of the source such that it is perceived by the primary microphone and therefore to the position in which it is appropriate to spatialize the audio spot signal in the referential of the primary microphone.

An aspect of the disclosure is based on the omni-directional component of a ambisonic signal which represents a field of acoustic pressure and contains no information on the position of the acoustic source. Due to its omni-directional character, it is guaranteed to find in this component of common characteristics with the spot signal.

The implementation of the method according to an aspect of the disclosure allows to obtain a value of estimated delay for a block of the frame of reference. It is advantageously repeated for the other blocks of this frame.

Unlike the sound engineer, who generally measures a distance between the primary microphone and the spot microphone, who deduces a delay that he must adjust manually to compensate for the fact that the source is not necessarily very close to the spot microphone, an aspect of the disclosure allows to obtain the actual delay between the spot and primary signals.

The determination of this value of delay is then used to estimate at least one angular position of the audio spot signal in the 3D referential of the primary microphone. This angular position corresponds to that of the source located in the vicinity of the spot microphone in the referential of the primary microphone.

To do this, an aspect of the disclosure calculates projections of the spot signal delayed by the estimated delay on some directional components of the primary signal encoded in the ambisonic format and a ratio between these projections to deduct an estimate of an angular position of the source on a plane of the referential of the primary microphone from which the ambisonic signal has been encoded.

In practice, a block of reference can be advantageously chosen in the monophonic signal of the spot microphone, and be compared to different blocks of observation of the same size, stemming from the observation area located in the ambisonic signal, from a moment posterior to the moment of acquisition. This approach allows to choose a block of reference in a relatively clean signal in the sense that the relative source will be captured with a good signal to noise ratio. This also allows in some cases to identify a signal characteristic as an attack (or transient) which will be more easily detectable in the ambisonic signal.

A block of reference may also be advantageously located in the ambisonic signal of the primary microphone, and be compared to blocks of observation of the observation area located in the audio signal of the spot microphone. This approach allows to minimize the algorithmic latency of the method since in choosing as a block of reference the last samples of the frame of the ambisonic signal, it is possible to provide an estimate of the delay to apply directly to these last samples. This was not necessarily the case in the previous approach, where the block of observation which was the most similar to the block of reference is not necessarily located at the end of the new frame.

According to another aspect of the disclosure, the block of reference being chosen in the audio spot signal, the stage of the estimation of the delay comprises a calculation of a similarity measurement at least for the block of reference, from a norm cross-correlation function ($C_i$) which is expressed in the following way:

$$C_i(\tau) = \frac{\langle a_n \mid W \rangle_{-\tau}}{\|a_n\| \cdot \|W\|_{-\tau}}$$

with $W(t)$ the omni-directional component of the ambisonic signal, $\alpha_n(t)$ spot signal, $\langle x \mid y \rangle_\tau =_0 \langle x \mid y \rangle_\tau$ the scalar product between the two finite support signals temporally offset by $\tau$, in the observation area associated with the block of reference ($BRef_I$), and $\|x\|_\tau = \sqrt{\langle x \mid x \rangle_\tau}$, the norm of a finite support discrete signal;
and the delay ($\tau$) is estimated from the maximum value of the similarity measurement calculated:

$$\tilde{\tau} = \text{Argmax}_\tau C_i(\tau) = \text{Argmax}_\tau \frac{\langle a_n \mid W \rangle_{-\tau}}{\|a_n\| \cdot \|W\|_{-\tau}}.$$

An advantage of this measurement is that it is a low cost solution compared to the statistical methods with order higher than 1.

According to another aspect of the disclosure, the step to estimate the delay comprises in addition a temporal smoothing of the similarity measurement calculated for the block of reference taking into account the similarity measurement calculated for at least one previous block of reference.

An advantage is to eliminate the secondary peaks associated with a periodicity of the signals and thus to increase the robustness of the estimated delay.

According to another aspect of the disclosure, the estimation of an angular position of the captured source comprises the estimation of an azimuth angle from a ratio between the scalar product of the signal of the block of reference associated with the predetermined moment of acquisition with the block of the component Y the audio primary signal offset by the estimated delay and the scalar product of the signal of the block of reference associated with the predetermined moment of acquisition with the block of the component X of the primary audio signal offset by the estimated delay.

An aspect of the disclosure consists in projecting the spot signal on the components X and Y the primary, which allows to select in the primary signal what comes from the spot microphone.

In a beneficial way, the azimuth angle is estimated from the following equation:

$$\tilde{\theta}_n = a\tan 2(\langle a_n \mid Y \rangle_{-\tau}, \langle a_n \mid X \rangle_{-\tau})$$

An advantage of the function a tan 2 that is a variation of the Arctangent function is that it gives results between $]-\pi, \pi]$.

According to another aspect of the disclosure, the estimation of a spatial position comprises the estimation of an elevation angle from a ratio between the scalar product of the block of reference of the audio spot signal associated with the moment of acquisition with the block of the component Z the primary audio signal offset by the estimated delay ($\tau$) and the scalar product of the block of the audio spot signal associated with the moment of acquisition with the block of the omni-directional component of the primary audio signal offset by the estimated delay ($\tau$).

An aspect of the disclosure proposes to calculate the angle of elevation in projecting the spot signal on the components Z and W the primary, which allows you to select in the primary signal which comes from the spot microphone.

Advantageously the elevation angle is estimated from the following equation:

$$\tilde{\varphi}_n = \arcsin\left(\frac{\langle a_n \mid Z \rangle_{-\tau}}{\eta \cdot \langle a_n \mid W \rangle_{-\tau}}\right)$$

According to still another aspect of the disclosure, the process also comprises an estimation of a gain parameter from a ratio between the scalar product of the block of reference of the audio spot signal and of the block of the omni-directional component of the primary audio signal offset by the estimated delay and the norm of the block of the audio spot signal.

To estimate the gain level between the two signals, one uses the omni-directional component to the primary signal, which does not favor any particular direction.

Advantageously, the gain parameter is estimated from the following equation:

$$\tilde{g}_{m,n,W} = \frac{\langle a_n \mid W \rangle_{-\tau}}{\|a_n\|^2}$$

According to another aspect of the disclosure, the method comprises a step of calculation for a local index of reliability associated with a mixing parameter estimated for the block of references, by analysis of the function of the standardized cross-correlation calculated between the block of the audio spot signal associated with the predetermined moment of acquisition and the block of the omni-directional component of the primary audio signal offset by the estimated delay and energy of the signal of the block of reference.

An advantage of this solution is particularly that it reuses the values of the cross-correlation function calculated for the estimation of the delay Advantageously the local index of reliability associated with the delay parameter estimate is based on a ratio between the values of the primary peaks and secondly the cross-correlation function multiplied by the energy of the block of reference.

Association with the detection of peaks of the cross-correlation function and a calculation of the energy of the block of reference, allows to obtain an index of reliability.

According to still another aspect of the disclosure, the local index of reliability associated with the parameter of angular position is based on the maximum value of the cross-correlation associated with the estimated delay $\tau_i$ and on a ratio between the energy of the block of reference and that of the block of observation.

According to still another aspect of the disclosure, the steps of estimating delay and position are repeated for the plurality of reference blocks in the frame of the audio spot signal and the method comprises in addition a step of calculating the global indices of reliability associated with the mixing parameters estimated for the frame of reference, from the local indices calculated for a block of reference of said frame and global indices calculated for the previous frame and a step of determining values of the mixing parameters for the current frame in function of the global indices of reliability calculated.

Advantageously, it chooses the values of parameters associated with indices of higher trust, so as to make the most reliable and the most heavy-duty possible estimate.

The method just described in these different embodiments is advantageously implemented by a data processing device for the estimation of mixing parameters according to the an aspect of the disclosure. Such a device comprises the following units:

estimation of a delay between the omni-directional component of the frame of the primary audio signal and the frame of the said spot signal, from a block of N samples of a frame of one of the two audio signals, so-called block of reference, associated with a predetermined moment of acquisition, and an observation area of the frame of the other audio signal, so-called observation area, including at least one block of N samples and formed in the vicinity of the moment of acquisition, by maximizing a measurement of similarity between the block of reference and a block of the observation area, so-called block of observation, temporally offset by a delay with respect to the block of reference; and estimation of at least one angular position of the source captured by said spot microphone in a referential of the primary microphone by calculation of a ratio between a first scalar product of a block of the audio spot signal associated with the moment of predetermined acquisition and of a first component of the block of the primary audio signal offset temporally by the estimated delay ($\tau$) and a second scalar product of the same block of the audio spot signal and a second component of said block of the primary audio signal temporally offset by the estimated delay ($\tau$).

Of course, the processing data device according to an aspect of the disclosure can be arranged to implement, either independently or in combination, the whole of the embodiments just described for the processing method.

Correlatively, an aspect of the disclosure also relates to a method of mixing of at least one audio spot signal and of a primary audio signal representative of a same sound scene composed of a plurality of acoustic sources, the audio spot signal being picked up by a sound recording device, so-called spot microphone, located in close proximity of a source and the primary audio signal being picked up by an ambisonic sound recording device able to capture the plurality of sources, comprising the following steps:

getting mixing parameters of the audio spot signal and of the primary audio signal, said parameters being estimated by the processing method according to an aspect of the disclosure, including at least one delay and at least one angular position;

processing the spot signal at least from the estimated delay;

spatial encoding of the audio spot signal delayed from at least one estimated angular position; and summing said components with at least one ambisonic spot signal with the primary ambisonic signal into a global ambisonic signal.

With an aspect of the disclosure, the sound engineer benefits from assistance when mixing audio signals picked up for a same sound scene. The mixing process can be implemented from the automatically estimated parameters according to an aspect of the disclosure or adjusted accurately and manually by the sound engineer. In both cases, an aspect of the disclosure makes the task easier and saves time.

An aspect of the disclosure also relates to a user terminal comprising a mixing device according to an aspect of the disclosure.

Advantageously, the user terminal also comprises a device for processing data for the estimation of mixing parameters according to the invention. According to a variation, it can be connected to an external module comprising a device for processing data according to the invention.

An aspect of the disclosure relates further to a computer program with instructions for the implementation of the steps of processing data for the estimation of mixing parameters as described previously, when this program is executed by a processor.

An aspect of the disclosure also relates to a computer program with instructions for the implementation of the steps of a method of mixing as described previously, when this program is executed by a processor.

These programs may use any programming language. They can be downloaded from a network of communication and/or recorded on a computer readable medium. For example, they can be stored in a memory of a user terminal.

An aspect of the disclosure relates finally to non-transitory recording media, readable by a processor, integrated or not to the data processing device and to the mixing device according to an aspect of the disclosure, possibly removable, memorizing respectively a computer program implementing a data processing method and a computer program implementing a mixing method such as previously described.

5. LIST OF FIGURES

Other advantages and characteristics will appear more clearly when reading the following description of a particular embodiment of the disclosure, given simply by way of illustration and non-limiting, and appended drawings, wherein.

Figure 1A:
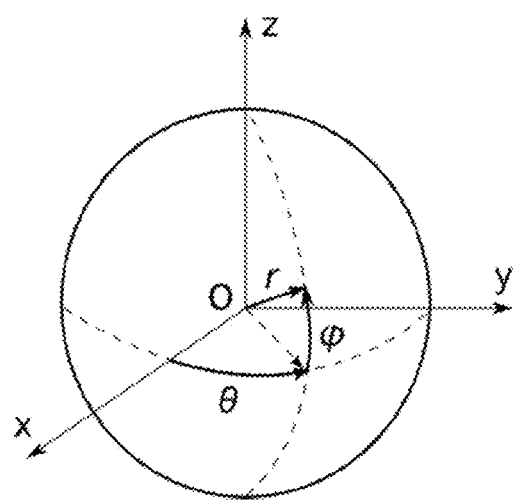
FIG. 1A illustrates in a schematic way a referential in which a point is positioned from its spherical coordinates.
Figure 1B:
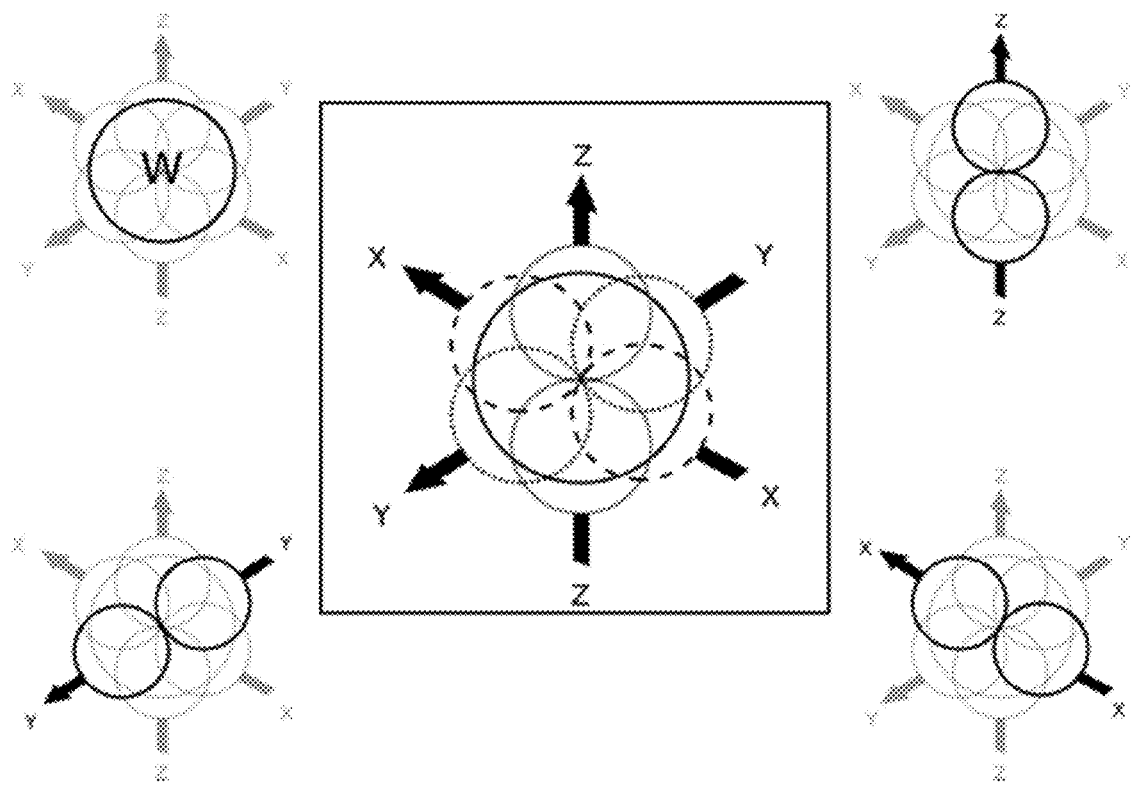
FIG. 1b illustrates in a schematic way a representation of the spatial ambisonic format encoding to higher levels or HOA, according to the prior art.
Figure 2:
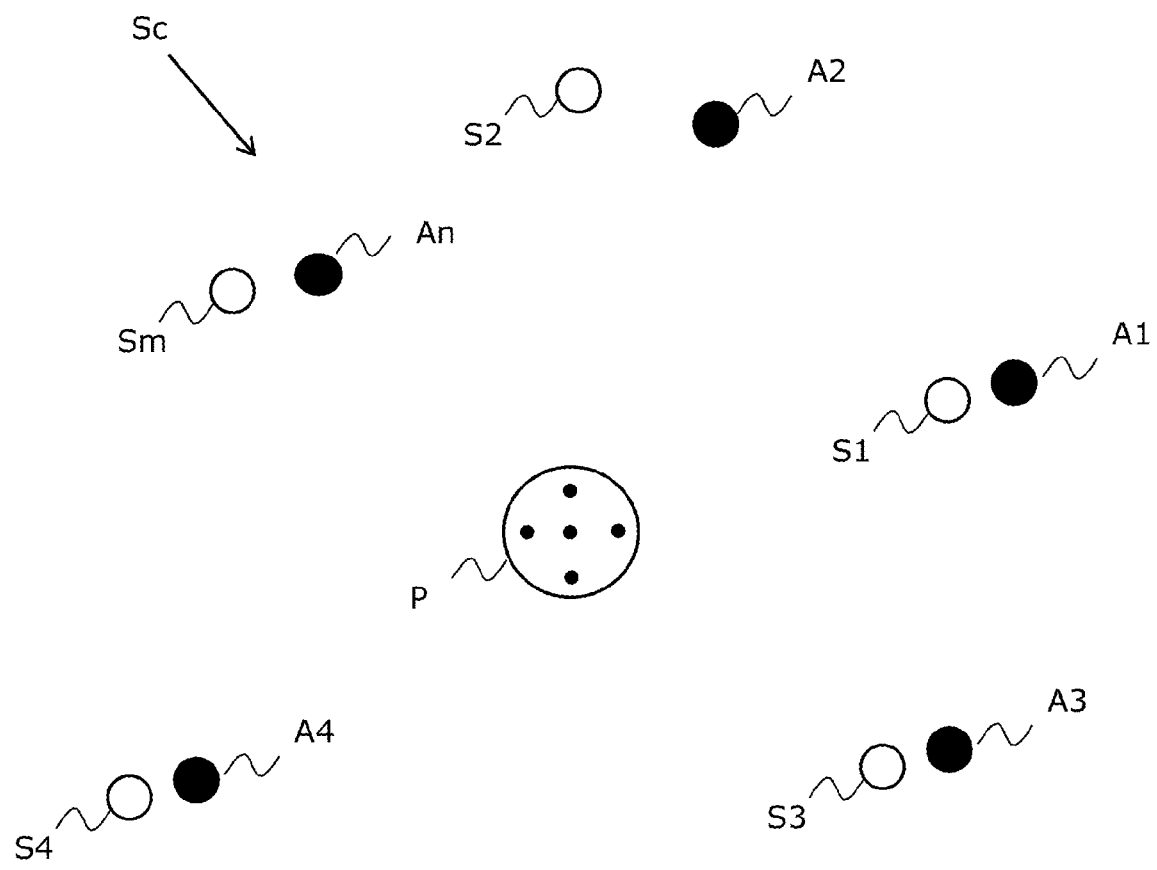
Figure 3:
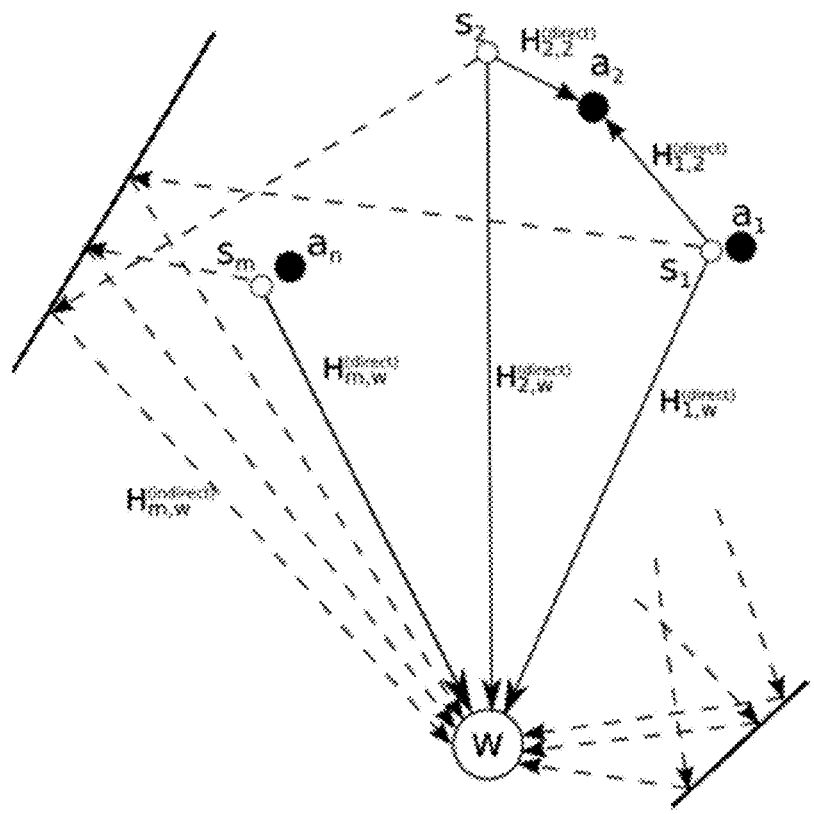
Figure 4:
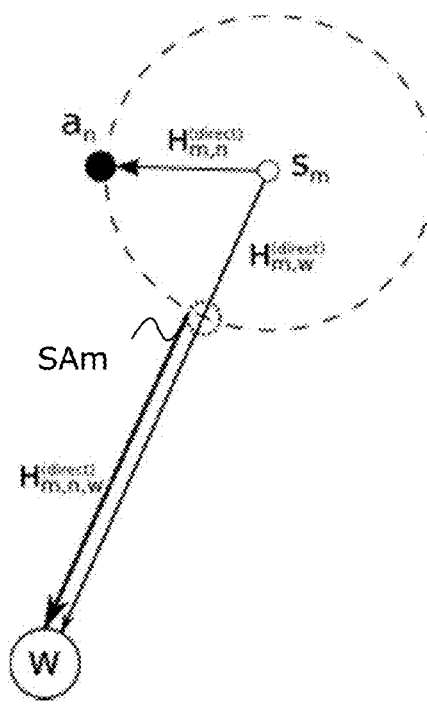
Figure 5:
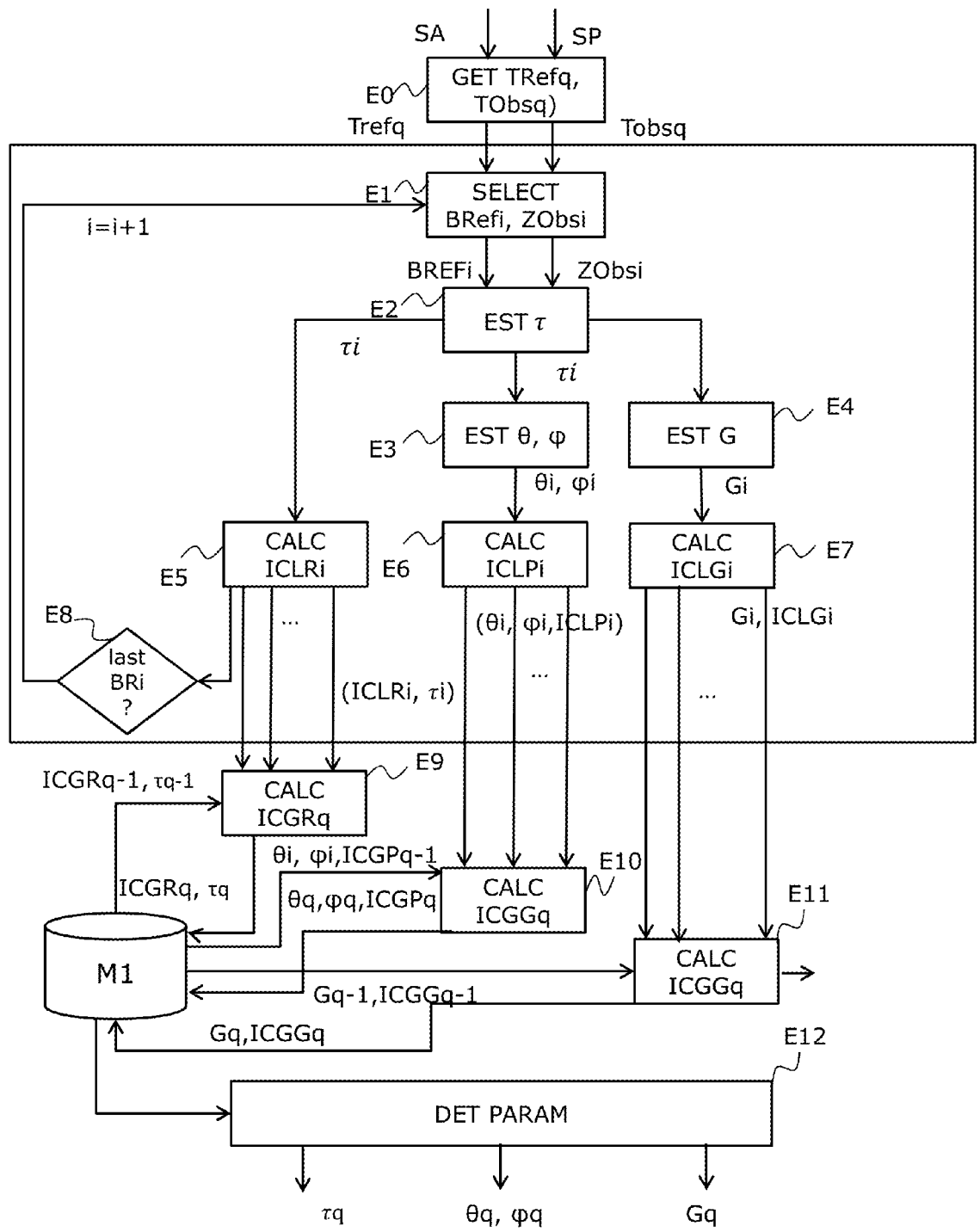
Figure 6:
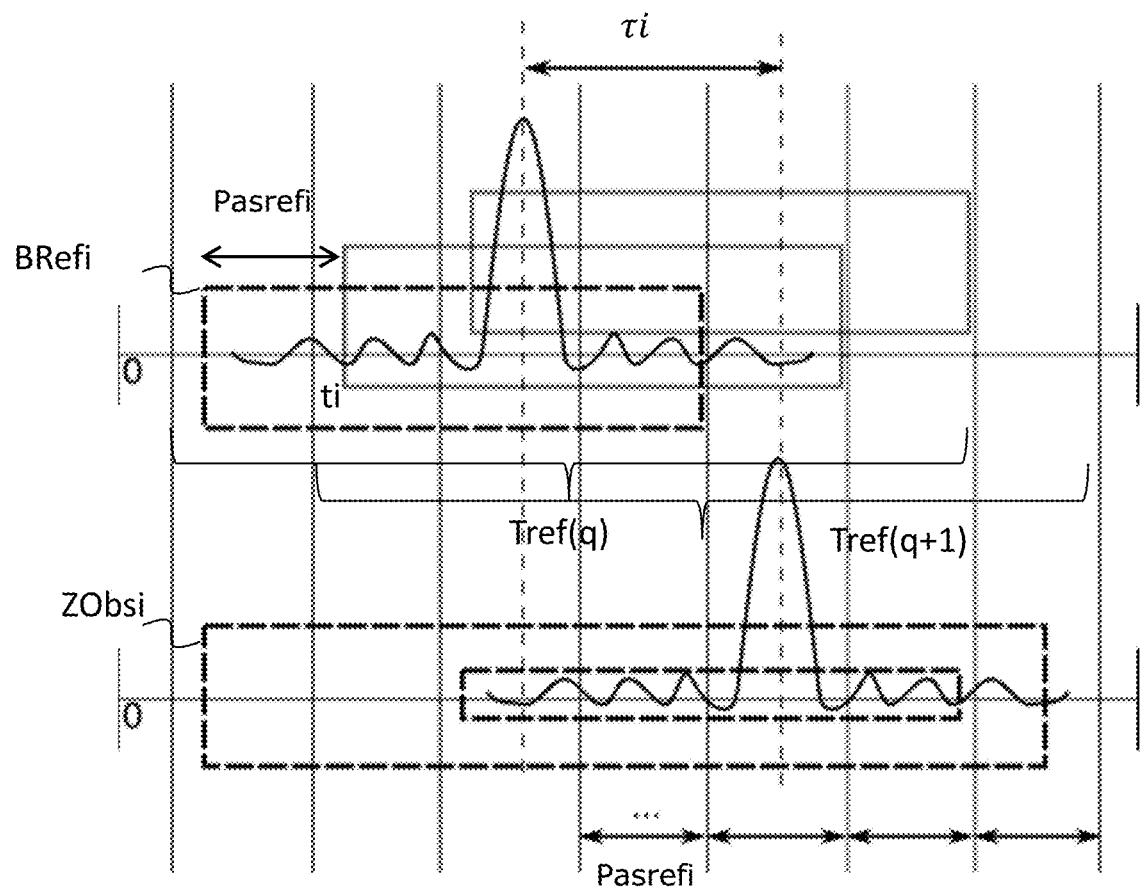
Figure 7A:
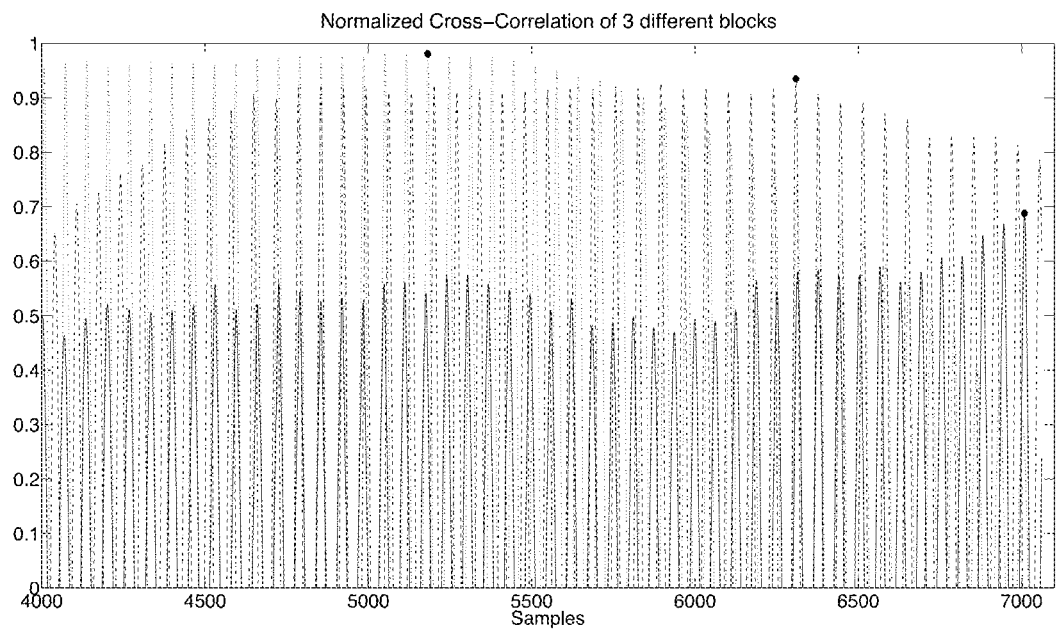
Figure 7B:
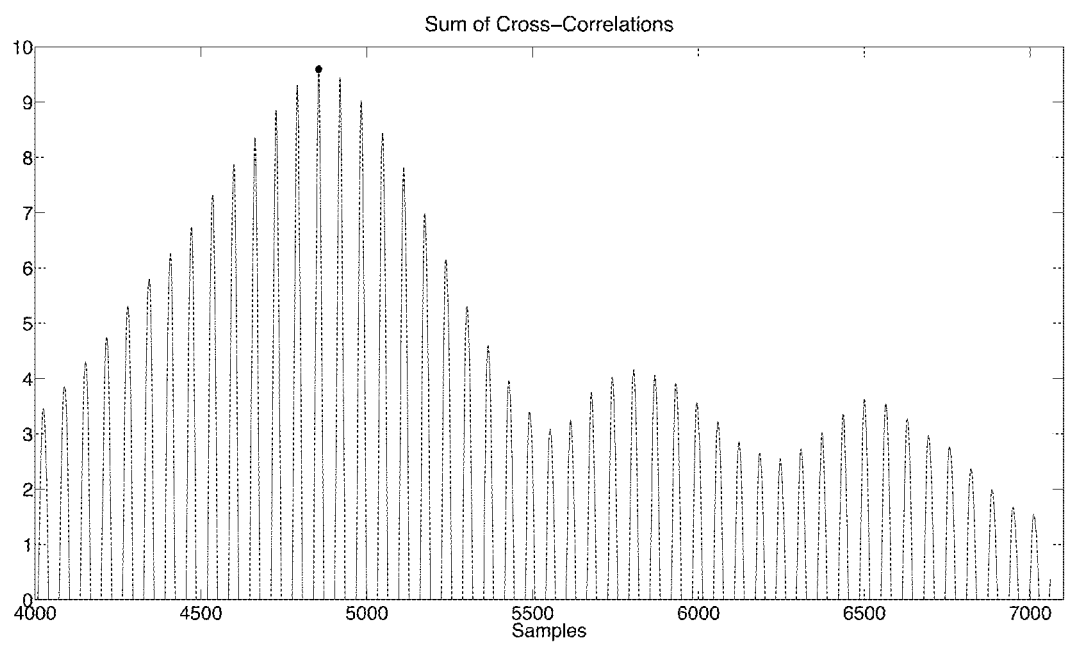
Figure 8:
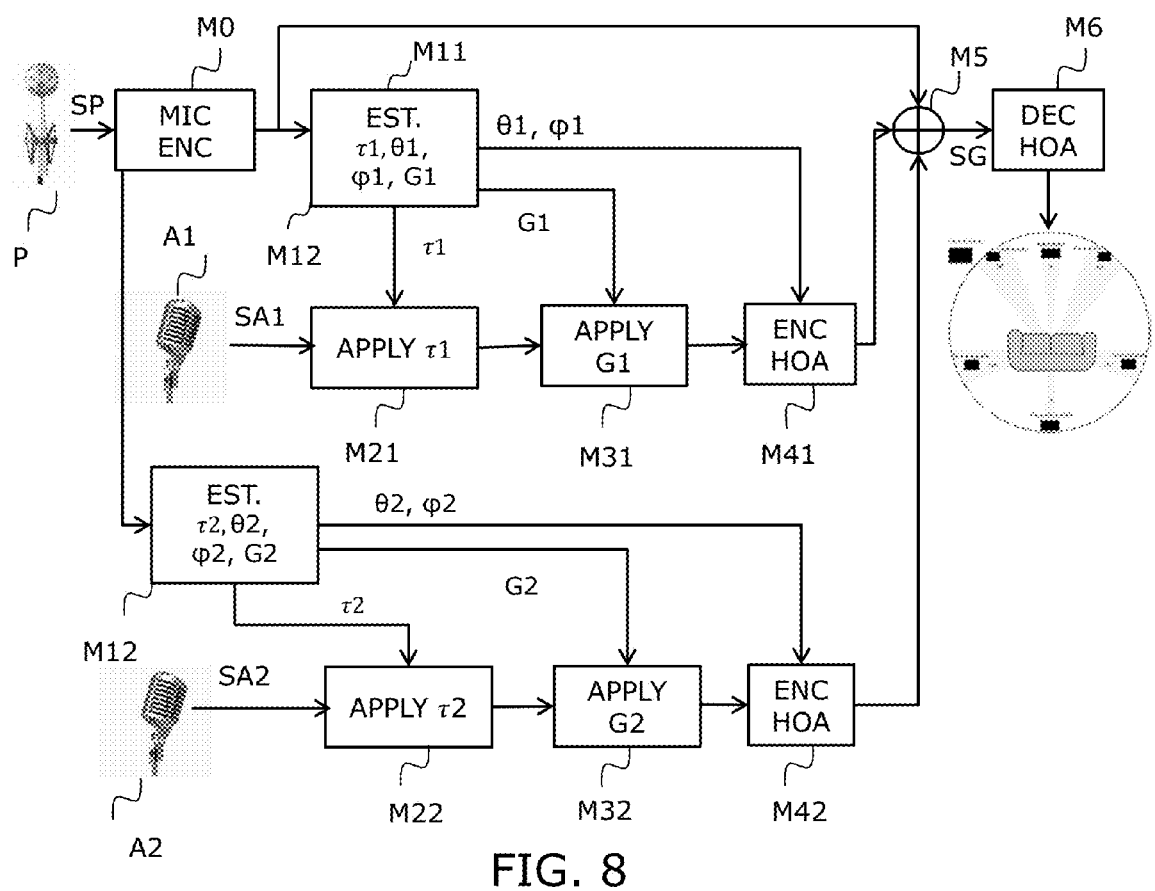
Figure 9:
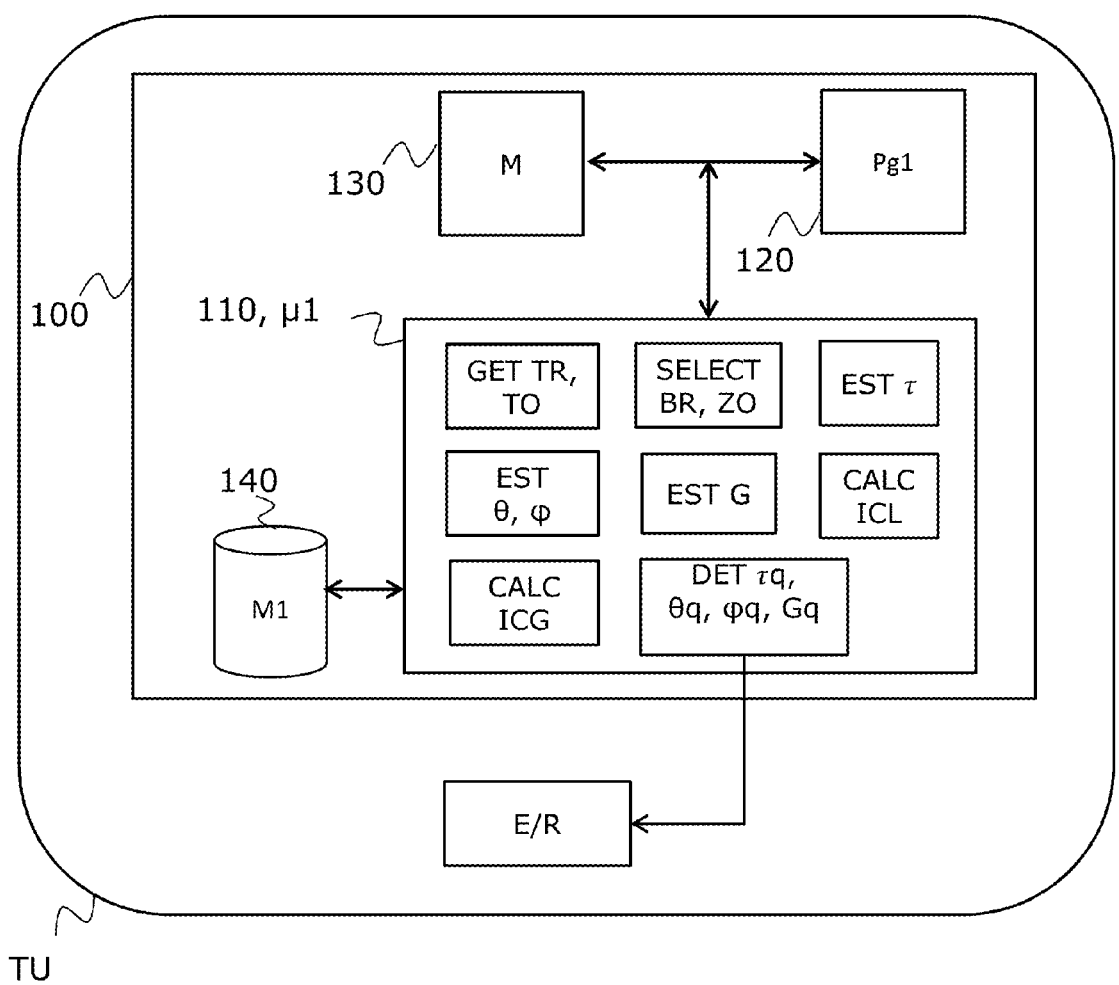
Figure 10:
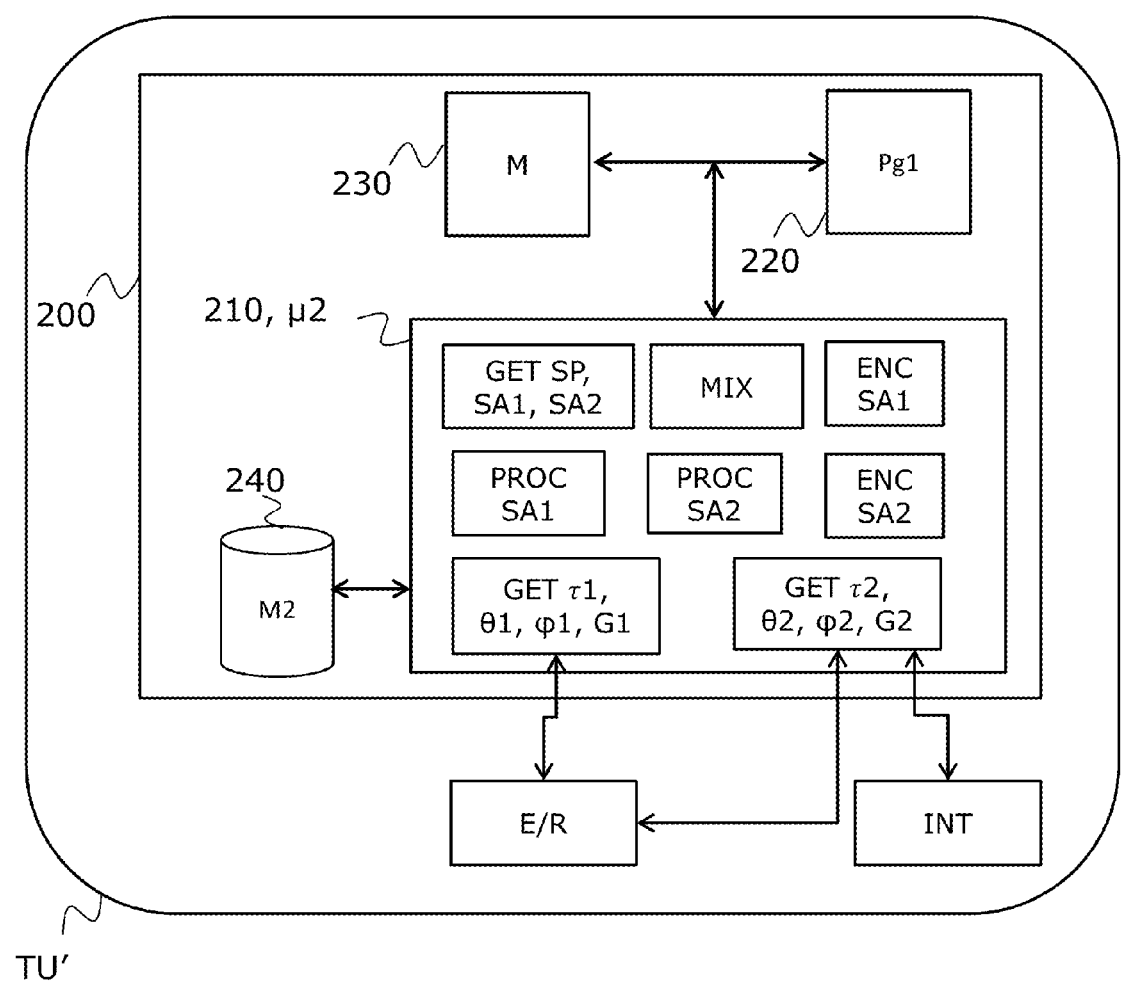

FIG. 2 presents a schematic example of arrangement of a primary microphone and several spot microphones for the capture of a sound scene;

FIG. 3 illustrates in a schematic way the direct and indirect routes followed by sound waves from the sources that make up the sound scene up to the microphones;

FIG. 4 illustrates in a schematic way an "apparent" position of an acoustic source located in the vicinity of a spot microphone in the referential of the primary microphone, according to an aspect of the disclosure;

FIG. 5 presents the steps of a method of estimation of mixing parameters according to an embodiment of the invention;

FIG. 6 illustrates the breaking down of an audio signal into frames and blocks according to an aspect of the disclosure;

FIGS. 7a and 7B present examples of curves of the similarity measurement implementation for the estimation of a delay between the primary and spot signals according to first and second aspects of the disclosure;

FIG. 8 presents the steps of a method of mixing the primary signal and spot signals according to an aspect of the disclosure;

FIG. 9 shows schematically the hardware structure of a device for the estimation of mixing parameters according to an aspect of the disclosure; and FIG. 10 shows schematically the hardware structure of a mixing device according to an aspect of the disclosure.

6. DESCRIPTION OF A PARTICULAR ASPECT OF THE DISCLOSURE

An exemplary, general principle of the disclosure is based on the calculation of projections of an audio signal picked up by a spot microphone on the components of an audio signal picked up by a primary microphone and encoded in ambisonic format, and on the exploitation of these projections to estimate automatically the parameters for mixing the spot signal with the primary signal.

In relation with FIG. 2, a primary microphone P is considered, comprising a system of capsules, three in number at least for a 2D-scene, or four in number at least for a 3D-scene. We use for example the Soundfield® order-1 microphone or Eigenmike® order-4 microphone. These capsules are arranged to capture a sound scene Sc in several directions.

The sound scene is formed of several acoustic sources S1, S2, ... Sm, with m non-zero integer, remote from each other. For example, a source consists of a particular musical instrument. The primary microphone P is advantageously placed centrally in relation to the plurality device of the acoustic sources. A spot microphone A1, A2, ... Am was placed in close proximity to each of these sources.

It is assumed that the spot microphones are monophonic, stereophonic even, that is to say that they are able to capture an audio signal in a monodirectional or even in a bidirectional manner.

In the following, we will consider that the spot microphones are monophonic and that the audio signal captured is in fact monodimensional.

The primary microphone produces a multidimensional audio signal SP.

To recreate the sound scene, the signals of the primary microphone and each spot microphone must be mixed. The aim is to adjust the signal from the spot microphone in the mixed signal, i.e. to define transformations of amplitude and/or phase to apply to the signal before its dissemination to speakers, to form a sound image that is consistent with that provided by the primary microphone.

The consistency sought must be spatial, and it is necessary to specify for this the angular position of the latter in space (2D: azimuth, 3D: azimuth and elevation). It must also be temporal, that is to say that we must reduce or cancel the temporal delay between the spot signals and the primary signals, in order to avoid the echo or coloring effects (comb filtering). This delay depends on the distance between the spot microphone and the primary microphone, given that the acoustic waves captured by spot microphone arrive at the primary microphone with a delay which is related directly to the distance. Finally, the appropriate mix of the source in the global scene is provided by adjusting the level of the gain spot signal with respect to the signal of the primary microphone.

We shall now describe the principles of estimation of the mixing parameters of a spot signal with the primary signal encoded in the HOA format.

The first four HOA components of the primary microphone are expressed as follows:

$$\begin{cases} W(t) = p(t) \\ X(t) = \eta \cdot p(t) \cdot \cos\theta \cdot \cos\varphi \\ Y(t) = \eta \cdot p(t) \cdot \sin\theta \cdot \cos\varphi \\ Z(t) = \eta \cdot p(t) \cdot \sin\varphi \end{cases} \quad (3)$$

where $\eta$ is the normalization factor, and p(t) the acoustic pressure of the captured sound field. The first component HOA W(t) captures only the acoustic pressure and contains no information on the position of the acoustic source.

In relation with FIG. 3, we consider in more detail the previous scene Sc. It is composed of acoustic sources each emitting a signal $s_m(t)$ towards N spot microphones An and the primary microphone P.

By separating the transformations induced by the direct and indirect routes, modeled by a transfer function $h_{m,W}$, between the source Sm and the primary microphone P, and introducing the intrinsic noise $v_W(t)$ of the omni-directional component of the primary microphone and the N intrinsic noise $v_n(t)$ of the spot microphones, the pressure field W(t) picked up by the primary microphone and spot signals $a_n(t)$ are then given by:

$$W(t) = \sum_{m=1}^{M} \{[h_{m,W}^{(direct)} * s_m](t) + [h_{m,W}^{(indirect)} * s_m](t)\} + v_w(t) \quad (4)$$

$$a_n(t) = \sum_{m=1}^{M} \{[h_{m,n}^{(direct)} * s_m](t) + [h_{m,n}^{(indirect)} * s_m](t)\} + v_n(t) \quad (5)$$

The equation (4) is widespread with other components of the primary microphone by replacing W by X, Y, Z.

To simplify the writing, we simply modelled the transformation of the direct travel by a delay $\tau_{m,W}$ and a gain $g_{m,W}$. It should be noted that in reality the transfer function $h_{m,W}$ should depend on the frequency to translate the effects of radiation, directivity and other acoustic characteristics.

$$h_{m,W}^{(direct)} = g_{m,W} \delta(t - \tau_{m,W}) \quad (6)$$

with $\delta$ symbol of Kronecker

Therefore the equations (4), (5) become:

$$W(t) = \sum_{m=1}^{M} \{g_{m,W} \cdot s_m(t - \tau_{m,W}) + [h_{m,W}^{(indirect)} * s_m](t)\} + v_w(t) \quad (7)$$

$$a_n(t) = \sum_{m=1}^{M} \{g_{m,n} \cdot s_m(t - \tau_{m,n}) + [h_{m,n}^{(indirect)} * s_m](t)\} + v_n(t) \quad (8)$$

$g_{m,W}$—respectively $g_{m,n}$—describes the mitigation (or the amplification) of the signal of m-th acoustic source such as captured by the primary microphone—respectively by the n-th spot microphone.

The gains associated with X, Y, Z additionally translate the directional encoding of the sound source:

$$\begin{cases} g_{m,X} = g_{m,W} \cdot \eta \cdot \cos\theta_m \cdot \cos\varphi_m \\ g_{m,Y} = g_{m,W} \cdot \eta \cdot \sin\theta_m \cdot \cos\varphi_m \\ g_{m,Z} = g_{m,W} \cdot \eta \cdot \sin\varphi_m \end{cases} \quad (9)$$

In general it is considered that the direct contribution is more important than the indirect contribution in terms of energy. Such is the case in particular when the sound engineer has placed the spot microphones so that each of them captures a preferred sound source. Further in the description, it will be assumed that this hypothesis is verified and that each spot microphone An is associated with an acoustic source Sm and m=n.

To simplify the writing of the equations one associates the same index m=n with the spot microphone and to the preferred sound source.

To perform the estimation of the parameters, we only have the signals of the primary microphone and those of the spot microphones, but not those of sound sources as such.

In relation with FIG. 4, the aim is to extract the delays $\tau_{m,W}$, between the source Sm and the primary microphone P, and $\tau_{m,n}$ between the source and the spot microphone An, from the signals picked up.

In practice, it is very difficult to estimate the delays $\tau_{m,W}$ and $\tau_{m,n}$ from the sole signals picked up.

Nevertheless, as shown in FIG. 4, we consider the delay difference between $\tau_{m,W}$ and $\tau_{m,n}$, the delay between the spot signal and the signal emitted by the source Sm.

The signal emitted by the source Sm is perceived in the same way and with the same delay $\tau_{m,n}$ in all points of a circle (represented by the dotted line in FIG. 4) centered on the source Sm and with a radius equal to the distance between the source and the spot microphone, in particular, at the point SAm of this circle located on the straight line linking the primary microphone P to the source Sm. The point SAm, located in the direction of the true source Sm for the primary microphone, can be seen as an apparent source for the primary microphone. Given that we do not know the distance between the source Sm and the spot microphone An, the analysis of the primary spot signals, leaves an indeterminacy on the distance from the source of the primary microphone. This point, so-called "apparent source", matches the minimum distance at which the source can be situated from the primary microphone. It represents the possible position of the source Sm if it were located close the side of the spot microphone An, so that there is no delay between source and spot. At this point, the delay between primary signal and spot signal corresponds to the difference of the delays between source/primary and source/spot.

We consider the difference $T_{m,n,W}$ between $\tau_{m,W}$ and $\tau_{m,n}$:

$$\tau_{m,n,W} = \tau_{m,W} - \tau_{m,n} \quad (10)$$

$\tau_{m,n,W}$ represents the delay between the spot signal and the primary signal at this point SAm. It is therefore this delay which should be applied to the spot microphone to synchronize it with the primary microphone.

To calculate this delay, we may advantageously use a normalized cross-correlation function which applies to two temporal x(t) and y(t) non-periodical signals and which is expressed as follows:

$$\chi_{x,y}(\tau) = \frac{\langle x(t) | y(t-\tau) \rangle}{\|x\| \cdot \|y\|} = \frac{\langle x | y \rangle_\tau}{\|x\| \cdot \|y\|} = \frac{\int_{-\infty}^{+\infty} x(t)y(t-\tau)dt}{\|x\| \cdot \|y\|} \quad (11)$$

where $\chi_{x,y}(\tau)$ is a measurement of similarity between the signal x(t) and the delayed signal y(t) of $\tau$; $\|x\|$, $\|y\|$ are the Euclidean norms $L^2$ of signals x(t) and y(t).

The cross-correlation $\chi_{x,y}(T)$ is a measurement of similarity between the signal x(t) and the delayed signal y(t) of $\tau$, calculated here on a continuous temporal and infinite support. In practice, the measurement is carried out on the audio digital signals to a discrete (sampled) and delineated support: is not considered for x (resp. y) as a vector of successive sample representative of what we want to characterize around a given moment. For the sake of convenience, and in order to be able to generalize the definition of the cross-correlation, we have introduced the notation of a scalar product between two signals temporally offset:

$$\langle (x(t-\tau_1) | y(t-\tau_2) \rangle =_{\tau_1} \langle x | y \rangle_{\tau_2} = \int_{-\infty}^{+\infty} x(t-\tau_1)y(t-\tau_2)dt \quad (12)$$

for a continuous infinite support.

For a discrete finite support, this scalar product is defined as follows:

$$_{d_1}\langle x | y \rangle_{d_2} = \sum_{k=K_1}^{K_2} x(k-d_1)y(k-d_2) \quad (13)$$

where $k = t \cdot f_s$ is the temporal discrete index, with $f_s$ the sampling frequency $d_1 = \tau_1 \cdot f_s$ and $d_2 = \tau_2 \cdot f_s$ the indices of time difference, and $K_1$ and $K_2$ the terminals of the temporal support, that will not appear in the notation for the sake of readability. In addition, later in the document, we will consider the variables as discrete, and the finite support functions, while continuing to use the notation $_{\tau_1}\langle x | y \rangle_{\tau_2}$ rather than $_{d_1}\langle x | y \rangle_{d_2}$, with the correspondences which have just been established.

It should be noted that $\langle x | y \rangle_\tau =_0 \langle x | y \rangle_\tau$ and $_\tau \langle x | y \rangle =_\tau \langle x | y \rangle_0$, and by introducing the following notation for the norm of a finite support discrete signal: $\|x\|_\tau = \sqrt{_\tau \langle x | x \rangle_\tau}$, it should be noted that $\|x\| = \|x\|_0$.

Thus, for finite support discrete signals (terminals $K_1$ and $K_2$), the normalized cross-correlation function is expressed in the following manner:

$$\chi_{x,y}(\tau) = \frac{\langle x | y \rangle_\tau}{\|x\| \cdot \|y\|_\tau} \quad (14)$$

The presence of the index $\tau$ for the norm of y value indicates that the value of this norm will depend on the offset applied to this finite support discrete signal.

After having introduced these notations, we will show how to apply this cross-correlation function in the calculation of the delay $\tau_{m,n,W}$ between the spot signal An and the primary signal P.

To estimate the delay, we applied the normalized cross-correlation function to signals W(t) and $a_n(t)$ replacing W(t) by the second member of the equation (7):

$$\chi_{W,a_n}(\tau) = \frac{\langle W | a_n \rangle_\tau}{\|W\| \cdot \|a_n\|_\tau} = \frac{\langle g_{m,W} \cdot s_m(t-\tau_{m,W}) | a_n(t) \rangle_\tau}{\|W\| \cdot \|a_n\|_\tau} \quad (15)$$

where $\tau_{m,W}$ is the delay between the source and the primary microphone, under the following assumptions:
the indirect paths and the intrinsic noise are neglected
on a given temporal range of observation, a single source m is active.

However, the signal $s_m$ is connected to the signal $a_n$ thanks to the equation (8), under the same assumptions:

$$a_n(t) = g_{m,n} \cdot s_m(t - \tau_{m,n}) \quad (16)$$

Accordingly, $s_m$ can be deduced as a function of $a_n$:

$$s_m(t) = \frac{1}{g_{m,n}} a_n(t + \tau_{m,n}) \quad (17)$$

This equation can also be written in the following manner:

$$s_m(t - \tau_{m,W}) = \frac{1}{g_{m,n}} a_n(t + \tau_{m,n} - \tau_{m,W}) \quad (18)$$

It follows that the equation (15) can be written:

$$\frac{\langle W | a_n \rangle_\tau}{\|W\| \cdot \|a_n\|_\tau} = \frac{\left\langle \frac{g_{m,W}}{g_{m,n}} a_n(t + \tau_{m,n} - \tau_{m,W}) \Big| a_n(t) \right\rangle_\tau}{\|W\| \cdot \|a_n\|_\tau} \quad (19)$$

However, in setting $$g_{m,n,W} = \frac{g_{m,W}}{g_{m,n}},$$

and $\tau_{m,n,W} = -(\tau_{m,n} - \tau_{m,W})$, the equation (19) can also be written using the equation (13):

$$\frac{\langle W | a_n \rangle_\tau}{\|W\| \cdot \|a_n\|_\tau} = \frac{g_{m,n,W} \cdot \tau_{m,n,W} \langle a_n | a_n \rangle_\tau}{\|W\| \cdot \|a_n\|_\tau} \quad (20)$$

It is possible to further simplify this equation by expressing the norm of W thanks to the equations (16) then (18), and by taking advantage of the proposed notations, where:

$$\|W(t)\| = \|g_{m,n,W} \cdot a_n(t - \tau_{m,n,W})\| \quad (21)$$

It follows that the equation (20) can be expressed in the following manner:

$$\frac{\langle W | a_n \rangle_\tau}{\|W\| \cdot \|a_n\|_\tau} = \frac{g_{m,n,W} \cdot \tau_{m,n,W} \langle a_n | a_n \rangle_\tau}{\|g_{m,n,W} \cdot a_n(t - \tau_{m,n,W})\| \cdot \|a_n\|_\tau} \quad (22)$$

In considering the gains represented by $g_{m,n,W}$ as positive, this equation can be simplified in the following manner:

$$\frac{\langle W | a_n \rangle_\tau}{\|W\| \cdot \|a_n\|_\tau} = \frac{\tau_{m,n,W} \langle a_n | a_n \rangle_\tau}{\|a_n\|_{\tau_{m,n,W}} \cdot \|a_n\|_\tau} \quad (23)$$

We note that the second member of the equation (23) corresponds to the function of standardized cross-correlation between the signal $a_n(t - \tau_{m,n,W})$ and the signal $a_n(t)$. It follows that when $\tau = \tau_{m,n,W}$ the function (23) gives a maximum unit value.

Thus, to find the value sought $\tau_{m,n,W}$, it is sufficient to identify the value $\tau$ for which the standardized cross-correlation between the known signals W(t) and $a_n(t)$ is maximum. In the case of general use, the signals from several sources are present in the primary signal W(t) while the spot signal $a_n(t)$ is much more representative of the sound source of which we want to estimate the parameters (especially in the absence of crosstalk). It is therefore more appropriate to take a piece of the spot signal as a reference and to search in the primary signal W(t) with what temporal offset one can find the piece of signal which resembles it the most. In other words, it is recommended to consider the standardized cross-correlation function:

$$C(\tau) = \frac{\langle a_n | W \rangle_{-\tau}}{\|a_n\| \cdot \|W\|_{-\tau}} \quad (24)$$

As in practice it is a priori the signal W(t) which is delayed with respect to the spot signal $a_n(t)$, the aim is therefore generally to search in W(t) over a portion of signal more recent than the portion of signal $a_n(t)$ taken as reference.

We therefore introduce the estimator $\tilde{\tau}$ (but also $\tilde{\theta}$, $\tilde{\phi}$, $\tilde{g}$) associated with the sought parameter $\tau_{m,n,W}$ (and respectively $\theta_n$, $\phi_n$, $g_{m,n,W}$). We define the target delay estimated as the maximum of the standardized cross-correlation function in the equation (24):

$$\tilde{\tau} = \underset{\tau}{\text{Argmax}}(C(\tau)) \quad (25)$$

From this estimated delay, we obtain the first spherical coordinated r of the spot signal $a_n(t)$ in the referential of the primary microphone.

The purpose is then to estimate the second and third spherical coordinates, namely the angles of azimuth and of elevation ($\theta_n$ and $\phi_n$) from the estimated delay $\tilde{\tau}$.

According to an aspect of the disclosure, we consider the 3 bidirectional HOA components X, Y, Z and we calculate the scalar product between the signal of the primary microphone and the signal of the spot microphone delayed by $\tilde{\tau}$.

The scalar products are written as follows:

$$\begin{cases} \langle X | a_n \rangle_{\tilde{\tau}} = \eta \cdot \langle W | a_n \rangle_{\tilde{\tau}} \cdot \cos\theta_n \cdot \cos\varphi_n \\ \langle Y | a_n \rangle_{\tilde{\tau}} = \eta \cdot \langle W | a_n \rangle_{\tilde{\tau}} \cdot \sin\theta_n \cdot \cos\varphi_n \\ \langle Z | a_n \rangle_{\tilde{\tau}} = \eta \cdot \langle W | a_n \rangle_{\tilde{\tau}} \cdot \sin\varphi_n \end{cases} \quad (26)$$

To calculate the azimuth $\theta_n$ and elevation $\phi_n$ of the signal picked up by the spot microphone $a_n$ located in the vicinity of the acoustic source, we use the same assumptions as previously:
the indirect paths and the intrinsic noise are neglected
on a given temporal range of observation, a single source m is active.

The ratio between the second and the first equation of the system (26) allows to obtain the azimuth $\tilde{\theta}$ through the function a tan 2.

$$\tilde{\theta}_n = a\tan 2(\langle Y | a_n \rangle_{\tilde{\tau}}, \langle X | a_n \rangle_{\tilde{\tau}}) \quad (27)$$

The function a tan 2 has the advantage of providing measures of angles included in an interval $[-\pi,\pi]$ while the classic arctangent function only allows to obtain the angles in an interval $$[-\frac{\pi}{2}, \frac{\pi}{2}],$$

which leaves some ambiguity on diametrically opposed angles.

We deduce the elevation $\tilde{\phi}$ of the last equation of the system (26):

$$\langle Z | a_n \rangle_{\tilde{\tau}} = \eta \cdot \langle W | a_n \rangle_{\tilde{\tau}} \cdot \sin\tilde{\varphi}_n \Rightarrow \tilde{\varphi}_n = \arcsin\left(\frac{\langle Z | a_n \rangle_{\tilde{\tau}}}{\eta \cdot \langle W | a_n \rangle_{\tilde{\tau}}}\right) \quad (28)$$

From the estimator $\tilde{\tau}$ given by the equation (25) the level of the gain $\tilde{g}_{m,n,W}$ may be estimated as a ratio between the scalar product of the signal of the primary microphone and the signal of the spot microphone, and the scalar product of the signal of spot microphone by itself:

$$\tilde{g}_{m,n,W} = \frac{\langle W | a_n \rangle_{\tilde{\tau}}}{\tilde{\tau} \langle a_n | a_n \rangle_{\tilde{\tau}}} \quad (29)$$

It should be noted that the estimators above apply a delay to the spot signal $a_n(t)$ while it is in the primary signal W(t) that we have applied an opposite delay when searching for said delay. These estimators remain valid, by considering that they apply with an additional temporal delay common to the two signals. By correcting this aspect, we finally obtain all the parameters that allow to delay, spatialize and mix the spot microphone with the primary microphone:

$$\tilde{\tau} = \underset{\tau}{\operatorname{Argmax}}\, C_i(\tau) \quad (30)$$

$$\tilde{\theta}_n = \operatorname{atan2}(\langle a_n | Y \rangle_{-\tilde{\tau}}, \langle a_n | X \rangle_{-\tilde{\tau}}) \quad (31)$$

$$\tilde{\varphi}_n = \arcsin\left(\frac{\langle a_n | Z \rangle_{-\tilde{\tau}}}{\eta \cdot \langle a_n | W \rangle_{-\tilde{\tau}}}\right) \quad (32)$$

$$\tilde{g}_{m,n,W} = \frac{\langle a_n | W \rangle_{-\tilde{\tau}}}{\| a_n \|^2} \quad (33)$$

In relation with FIG. 5, we describe the steps of a method of processing data for the estimation of mixing parameters according to an aspect of the disclosure. Such a method is based on the principles which have just been presented, that we apply to discrete signal frames. A frame is a portion of an audio signal picked up by a microphone, which is exchanged regularly between an external module of acquisition and a device for processing data for the estimation of mixing parameters according to an aspect of the disclosure. It is then stored in a memory or buffer. It is considered that it includes N samples, with N non-zero integer.

In the further description, we designate by reference signal the audio signal picked up by the spot microphone An. We designate by observation signal the signal W of the first (omni-directional) HOA component of the primary microphone. The reference signal and the observation signal are divided into frames.

We shall call $TRef_q$ a frame of the reference signal and $TObs_q$ a frame of the observation signal.

Of course, as previously mentioned, we could, in an inverse manner, choose the primary signal as a reference signal and the spot signal as an observation signal.

The audio spot signal contains elements likely to be identified also in the audio signal picked up by the primary microphone, or observation signal. The observation signal includes a portion of the temporally offset reference signal. It is the acoustic signal emitted by the source Sm in the vicinity of which we have placed the spot microphone An. We also consider a block of reference BRef as a piece of the reference signal containing nBRef samples. Ideally, it contains a fragment of characteristic signal, easily identifiable, as for example a portion of transitional signal. A frame of reference is generally composed of several BRef.

In the observation signal, we considered an observation area Zobs as a piece of the observation signal which includes ideally a portion of the reference signal delayed. The size of such an observation area (nZObs) is chosen based on a maximum possible distance (MPD) between the spot microphone and the primary microphone. We can also rely on the results obtained for the estimation of mixing parameters for the previous block of reference.

We designate by bloc of observation (Bobs) a block of nBRef samples from the observation area.

This block can be dragged in the observation area.

During step E0, we obtain at input a frame of reference $TRef_q$, with q non-zero integer, captured by the spot microphone An and a frame of observation $TObs_q$ captured by the primary microphone P.

In E1, we select a block of reference $BRef_I$ in the frame of reference $TRef_q$. It begins at the moment ti.

In relation with FIG. 6, each frame of reference (indexed by the index q) $TRef_q$ is constituted of one or several blocks of reference (indexed by the index I) $BRef_I$. The blocks of reference within a frame of reference can be disjointed, joined, or overlapped. Advantageously, one uses a feed forward pitch of the Block of reference noted $PasRef_i$. This pitch may be constant, size nBRef (blocks joined), greater (disjoint blocks) or smaller (blocks are overlapping), but this pitch can also be variable, so as to adapt to the signal, in order for example to adjust to an interesting characteristic of the signal as a transitional measurement which will be more easily identifiable in the observation area $ZObs_i$. Within a Frame TRef, we therefore switch from a block $BRef_I$ to the next block $BRef_{i+1}$ moving by the reference pitch $PasRef_i$ of samples.

Each frame of observation (indexed by the index q) $TObs_q$ is composed of one or several areas of observation (indexed by the index i) $ZObs_I$ relating to blocks of Reference $BRef_I$. The size nZObs to the observation area $ZObs_I$ is given by the sum of the size of the Block of Reference (nBRef) and the maximum delay possible (RMP) between the spot microphone and the primary microphone (RMP=DMP/Sound velocity, where Sound velocity≈1340 m/s). It should be noted that the size of the observation area can be variable depending on estimates made (for example, if the source is only very weakly mobile, it is unnecessary to seek a delay very different from that which has been found previously).

Within an observation area, we define the blocks of observation as successive blocks of size nBRef (same size as BRef) separated by PasObs (observation pitch) samples. This not is generally constant and equal to 1 (case of the classic cross-correlation), but may be more (or even variable, even linked to an optimization approach) in order to decrease the computing power necessary to the cross-correlation (i.e. the most expensive routine of the algorithm). The blocks of observation are introduced to explain precisely the calculation of similarity (cross-correlation).

We define zObs$_i$ as the signal in the observation area ZObs$_i$, contained in the primary signal W, and BRef$_I$ refers to the reference signal in the block of reference BRef$_I$, contained in the spot signal a$_n$. For the block of index i, the cross-correlation function to consider is then:

$$C_i(\tau) = \frac{\langle bRef_i | zObs_i \rangle_{-\tau}}{\| bRef_i \| \cdot \| zObs_i \|_{-\tau}} \quad (34)$$

During step E2, we estimate the delay $\tilde{\tau}$ from the equation (24) previously described, that is to say by searching in the observation area ZObs$_i$ the block of observation BRef$_I$ which maximizes the standardized cross-correlation function in the equation (34).

According to a first an aspect of the disclosure, we estimate the delay that maximizes the similarity measurement C$_i$(τ) calculated for the current block of reference BRef$_I$. An advantage of this embodiment is that it is simple to implement and requires no storage resources.

According to a second an aspect of the disclosure, we calculate the similarity measurement on several consecutive blocks, including current block of reference BRef$_I$ and at least one previous block BRef$_{I-1}$. We thus perform a temporal smoothing of the cross-correlation function on the plurality of blocks of successive reference to better emerge among the different peaks of each curve that which remains stable in the time, and which corresponds to the required delay.

This temporal smoothing can be implemented by standardized averaging of calculated similarity measurements:

$$C'_i(\tau) = \frac{1}{K+1} \sum_{k=0}^{K} C_{i-k}(\tau) \quad (35)$$

An advantage is that this method is simple. In relation with FIGS. 7a and 7B, we illustrate the result of this calculation when searching for a delay associated with a sung voice, mixed in the signal of the primary microphone with nine other sound sources (string and wind instruments). In this example, the observation was made on ten blocks of successive reference, and three curves are displayed (FIG. 7A) among the ten functions of associated cross-correlation. It should be noted that there have been negative values to 0 for more readability. We can see that these curves show each of many peaks among which one is common to all and corresponds to the required delay $\tilde{\tau}$. On the other hand, the maximum peak of each curve is placed elsewhere, due to the disturbance caused by the other competing sources in the signal of the primary microphone.

In relation with FIG. 7B, we present a curve corresponding to the average of the measurements of similarities calculated for the ten blocks of successive reference. We can see that it highlights the peak common to all curves, the others fading away. The point of the maximum value indeed corresponds to the delay sought.

Of course, other temporal smoothing modes are possible and achievable by any form of temporal filtering. Thus, for example, we can apply a finite impulse response filter (for Finite Impulse Response or FIR):

$$C'_i(\tau) = \sum_{k=0}^{K} b_k \cdot C_{i-k}(\tau) \quad (36)$$

where K refers to the depth of the filter and b$_k$(τ) the coefficients of the filter. We then use the function C'$_i$(τ) instead of C$_i$(τ) for searching for the delay in the equation (30).

A particular case is the averaging process described above, which amounts to determining b$_k$=1/(K+1).

It should be noted that this filtering FIR, requires to store K vectors of past cross-correlation values.

Alternately, we can apply a filtering to infinite impulse response (IIR). A particular case proposed by an aspect of the disclosure is to apply an autoregressive order-1 filter, which has the advantage of not requiring the memorization of a smoothed cross-correlation vector:

$$C'_i(\tau) = \alpha \cdot C'_{i-1}(\tau) + (1-\alpha) \cdot C_i(\tau) \quad (37)$$

This filtering is parameterized by α forgotten factor α between 0 and 1, which can be fixed or well adapted, piloted over time according to indicators of the signal. If it is fixed, it can be associated it with a convergence time target. Also, if we switched from a stationary situation where C$_i$(τ)=C$_A$, i<i$_0$ to another stationary situation where C$_i$(τ)=C$_B$, i≥i$_0$, C'$_i$(τ) would travel pc % (for example pc=90%) of the distance between C$_A$ and C$_B$ in K iterations, with K such that $$\alpha = \left(1 - \frac{pc}{100}\right)^K,$$

the number of iterations K itself being convertible to a convergence of time to pc % by multiplying it by the interval between two blocks of successive reference. If one chooses to make the forgotten factor adaptive, there will be a low value when the new available information is consistent and without ambiguity on the estimated delay, and in the opposite a value close to 1 when the new values of cross-correlation are low for example. An indicator of the possible signal to actuate the forgotten factor in the course of time is the maximum value of the standardized cross-correlation function.

As an example and without limitation of the disclosure, we can express the forgotten factor in the following manner:

$$\alpha = \alpha_{min} + F(C_{max}) \cdot (\alpha_{max} - \alpha_{min}) \quad (38)$$

where C$_{max}$ denotes the maximum value of C$_i$(τ) and F is a decreasing function on [0.1] having terminals 0 and 1. For example, F(C$_{max}$)=(1−C$_{max}^P$) where P is chosen (typically greater than 1, by example 3) to allow for setting aside low values of F(C$_{max}$) where the correlation would be very close to 1. In this way, α varies between a minimum value α$_{min}$ (for example 0.5) reached when the correlation is perfect (C$_{max}$=1) and a maximum value α$_{max}$ (for example 0.99) when the correlation is very low. The minimum and maximum values can be determined as a function of associated convergence times.

During step E3, we estimate the angular position of the spot signal with respect to the referential of the primary microphone.

The azimuth angle $\tilde{\theta}_n$ is estimated using the equation (26) described previously.

The elevation angle $\tilde{\phi}_n$ is estimated using the equation (27) described previously.

During step E4, we estimate the gain level $\tilde{g}_{m,n,W}$ between the reference signal and the observation signal, from the equation (28) described previously.

It is understood that these estimates which are instantaneous can fluctuate from one block of reference to the other.

During steps E5, E6, E7, which will now be described, we calculate a value of local index of reliability (ICL), representative of a reliability level that is associated with the parameters previously estimated for the block of reference $BRef_{r}$.

We consider the local index of Reliability ICLR associated with Delay, the local index of reliability ICLP associated with the angular position of the acoustic source (azimuth, elevation) and the local index of reliability ICLG associated with the level of the Gain.

In E5, according to a particular embodiment, the Local Index of Reliability ICLR associated with the Delay is calculated from two values of the cross-correlation function described previously and an estimate of the energy of the Block of Reference. We can therefore express ICLR in the following manner:

$$ICLR_i = \text{Ratio}_i \cdot E_{ref_i} \quad (39)$$

where $\text{Ratio}_i$ is defined (in detail later) as the ratio between the first two peaks of the cross-correlation function in the Block of Reference $BRef_i$, and $E_{ref_i}$ is the energy of the Block of Reference $BRef_r$.

It should be noted that in the case of a periodic signal, within a Block of Reference, the cross-correlation function might provide several maximum values, corresponding to several peaks. In the presence of noise, the selection of the maximum value can therefore lead to an error on the value of delay, corresponding to a multiple of the fundamental period of the signal. It can also be noted that in the presence of an attack or a "transitional" according to a term spent in the field of signal processing, the cross-correlation function usually presents a main peak more distinct. We deduce that a function that allows to determine the differences in amplitude between the 2 main peaks of the cross-correlation function allows to provide heavy-duty information (more heavy-duty than the maximum value of the cross-correlation, which may be the maximum in the case of a periodic signal) on the level of reliability to be granted to the estimator of the delay.

You can write the equation (25) through the notation introduced and express the estimated delay corresponding to the maximum of the main peak of the cross-correlation function ($\tilde{\tau}_{princ_i}$ where $\tilde{\tau}_i$) and the second delay $\tilde{\tau}_{sec_i}$ corresponding to the secondary peak:

$$\tilde{\tau}_{princ_i} = \tilde{\tau}_i = \underset{\tau}{\text{Argmax}}\, C'_i(\tau) \quad (40)$$

$$\tilde{\tau}_{sec_i} = \underset{\tau \neq \tau_i}{\text{Argmax}}\, C'_i(\tau) \quad (41)$$

In order not to take into account the values close to the maximum value of the cross-correlation that belong to the same peak (which corresponds to the natural decay of the cross-correlation function), it is necessary to exclude a certain vicinity. In a particular embodiment, we can exclude all successive adjacent values lower to 5% of the maximum value.

In another embodiment, we only consider a secondary peak when the value of the cross-correlation function is lowered, between the main peak and the secondary peak at hand, below a certain threshold relative to the maximum value. This threshold may be zero, in which case the criterion considered is the change in the sign of the cross-correlation function between the two peaks selected. However, any other peak searching algorithm such as those described in "PEAK SEARCHING ALGORITHMS and APPLICATIONS", D. Ventzas, N. Petrellis, SIPA 2011, can be adapted to determine the secondary peak, including peak searching algorithms in the temporal domain.

The values of the main and secondary peaks (already calculated during the step of cross-correlation) are given by:

$$V_{princ_i} = C_i(\tilde{\tau}_{princ_i}) \quad (34)$$

$$V_{sec_i} = C_i(\tilde{\tau}_{sec_i}) \quad (35)$$

$\text{Ratio}_i$ is thus expressed as the following report:

$$\text{Ratio}_i = \frac{V_{princ_i}}{V_{sec_i}} \quad (44)$$

It should be noted that in the case of the presence of an important signal in the block of reference (reflecting the presence of an active source), this signal should logically also be present in the observation area. By contrast, if there is no signal (or low noise) in the block of reference (reflecting the absence of active source), we may then question the level of reliability granted to the estimator of the delay. This aspect will be addressed later, in relation with the notion of the index of reliability associated with the estimated parameters.

$E_{ref_i}$ is expressed in the following manner:

$$E_{ref_i} = \|BRef_i\|\tilde{\tau}_{princ_i} \quad (45)$$

Advantageously, the function $ICLR_i$ is therefore expressed in the following manner:

$$ICLR_i = \frac{V_{princ_i}}{V_{sec_i}} \cdot E_{ref_i} \quad (46)$$

It will be noted that the sound signals of periodic nature are admittedly accompanied, locally, by an ambiguity on the determination of the delay. Nevertheless they are advantageously potentially more frequent than the signals of transitional nature and it is interesting to be able to exploit them to update more regularly the estimated parameters. Temporal smoothing of the cross-correlation previously described helps to reduce this ambiguity but at the price of a lesser reactivity to situations where the delay effectively changes (when the sound source moves). According to an embodiment variation, an aspect of the disclosure uses relatively periodic signals as soon as the maximum value of the cross-correlation is sufficient. In these conditions, this variation is based on two principles:

if there is an error in the estimation of the delay and therefore of resynchronization of the spot signal with respect to the primary, this is not harmful to the extent where it is done with an integer number of periods of the signal, and it avoids the phenomena of comb filtering we can remove the ambiguity on the delay in function of past estimates:
either we already had an estimate considered reliable in recent past and therefore, it is reasonable to consider that the new delay corresponds, among the primary peaks of cross-correlation, to those the closest to the former, calculated on an inter-correlation, smoothed or not or the signal period evolves in time, in which case the "good" delay is that which corresponds to the peak of cross-correlation which remains the more stable temporally, other deviating or close to each other and around this stable value, in proportion to the period of the signal.

In cases when, from one frame to the next, there is a jump in the value of the delay which corresponds to an integer number of periods, an aspect of the disclosure advocates to calculate two delayed versions (with the old and the new values) and to perform a cross fade over a period of transition which may coincide with the frame.

Of course, one can imagine to introduce other criteria to improve the robustness or the accuracy of the reliability index.

In the course of step E6, we calculate the local index of reliability relative to the position of the reference signal in the referential of the observation signal.

According to a particular embodiment, the calculation of the index ICLP is based on the maximum value of the cross-correlation (associated to the delay $\tilde{\tau}_i$) and on the ratio between the energy of the signal of the spot microphone (BRef$_i$) and that of the primary microphone (Bobs$_i$):

$$E_{ref/obs_i} = \frac{\|bRef_i\|}{\|bObs_i\|_{\tilde{\tau}_i}} \quad (47)$$

$$ICLP_i = ICLG_i = V_{princ_i} \cdot E_{ref/obs_i} \quad (48)$$

During step E7, the same value is assigned to the local index of reliability relative to the level of gain.

It can be noted that according to this particular embodiment, the indices ICLP and ICLG have the same value, but we can imagine other criteria specific to the position or to a gain. For example, one can add a criterion of diffuse nature of the source (indicative of the presence of a reverberation which could disrupt the estimate of the position), for example in the form of a weighting of value smaller than one, which would decrease the value of the index of reliability associated with the position.

$$ICLP_i = \beta_{azi/ele} \cdot V_{princ_i} \cdot E_{ref/obs_i} \quad (49)$$

where $\beta_{azi}$ depends on the X and Y components of the primary signal and $\beta_{ele}$ depends on Z.

In the description given, the ICLP index represents an index of reliability valid both for the angles of azimuth and elevation. We can nevertheless, in another mode of embodiment, take advantage of ICLPazi and ICLPele independent indices who can provide different values to operate accordingly in the modules of the calculation of following Global indices of reliability (for example to update the parameter of azimuth while reusing the parameter of elevation stored for the previous frame).

In E8, we test whether the current block of reference BRef$_i$ is the last of the frame. If this is the case, we switch to the following steps. Otherwise, we increment the value of the index i and we repeat the previous steps on the block of reference following the frame q.

During steps E9, E10 and E11, we now calculate global indices of reliability (IGC) for the current frame q. They are obtained from the indices of local reliability calculated for the blocks of reference of the current frame q and associated with the values of parameters estimated for these blocks and the values of global index of reliability calculated for the previous frame q−1, associated with the values of the parameters estimated for these frames.

Advantageously, it combines the values of the local and global index of reliability in the following manner:

$$ICGX_q = f(ICLX_1, ICLX_2, \ldots, ICLX_I, ICLX_{q-1}) \quad (50)$$

where X represents R, P or G, F is a combination function, $ICG_{q-1}$ is the global index of reliability of the previous frame q−1 and I corresponds to the number of blocks of reference in the current frame.

For q=1, it initializes the index of reliability to a minimum value, for example zero.

According to a particular embodiment, the function f merely carries out a comparison of the values of all the values of indices ICLX$_i$ with i=1 to I, calculated for the blocks of the frame q and $ICGX_{Q-1}$, the highest value being retained and attributed to $ICGX_q$.

This allows you to update, for the current frame q, the value of the index of reliability and its associated parameter (ICLX$_q$, X$_q$), when the value of the index of reliability calculated for one of the current blocks of reference is higher than the value of the index of reliability of the previous frame q−1 stored in memory, or vice versa to retain the index of reliability and its associated parameter calculated for the previous frame as long as the reliability indices of all blocks of reference calculated for the current frame have not helped to provide a value of sufficient trust.

In an advantageous embodiment, a single value ICLX can be calculated by comparing gradually the values ICLX$_i$ associated with each of the blocks of reference. It follows that we combine the values of the local and global rindices of reliability in the following manner:

$$ICGX_q = f(ICLX, ICGX_{q-1}) \quad (51)$$

where the function f merely carries out a comparison of 2 values: ICLX and $ICGX_{q-1}$, the highest value being retained and attributed to $ICGX_q$.

This embodiment advantageously limits the amount of information stored.

Step E9 therefore calculates the value of a global index of reliability in the estimate of the ICGR delay for the frame of reference TRef$_O$ according to the equation (43) or (43') and associates it with the delay value corresponding to the local index of reliability or previous to the higher. For example, if this is the block of reference BRef$_I$ which has obtained the value of local index higher than the frame q and if this value is also superior to the index obtained for the frame q−1, the extracted delay value is $\tilde{\tau}i$.

Step E10 therefore calculates the value of a global index of reliability relative to the estimation of the ICGP position for the reference frame TRef$_O$ according to the equation (43) or (43') and associates it with the value(s) of the angular position $\tilde{\theta}_q, \tilde{\phi}_q$ corresponding to the highest local or previous index of reliability Step E11 therefore calculates the value of a global index of reliability in the estimation of the gain ICGR for the reference frame TRef$_O$ according to the equation (43) or (43') and associates it with the gain value G$_q$ corresponding to the highest local or previous index of reliability°.

In another embodiment, the function f minimizes one cost function which takes into account for example a combination of the distribution of the values of the parameters and associated reliability indices.

According to a variation, an oversight coefficient is applied to $ICGX_{q-1}$ in order not to remain blocked at a maximum value. The addition of this possibility of oversight is particularly useful when the spot microphone moves over the course of time. In this case, the value of the parameter estimated for one of the previous frames is not necessarily more reliable than the current value.

In E12, the values of the estimated parameters are determined on the basis of global index calculated by frame q, the values associated with the maximum values of index of reliability being chosen. This allows to obtain, the estimated output values of the parameters of delay $\tilde{\tau}$, of angular position $\tilde{\theta}_n$, $\tilde{\omega}_n$ and of gain $\tilde{g}_{m,n,W}$ the most reliable for the current frame q.

The principle selection of estimated parameters just described is given as an example. The advantage is that it is relatively inexpensive in terms of the calculation.

According to another an aspect of the disclosure and based substantially on the same overall architecture, we shall replace each global index of reliability associated with a given frame with a vector consisting of at least one or several indicators, and we will deduce dynamically for each frame, from the vector associated with the current frame and vectors associated with surrounding frames (in previous general), a state characterized by the estimated mixing parameters (delay, angles, gain).

The indicators of the vector will include for example: the maximum cross-correlation value and the associated delay, the delays and values associated with the secondary cross-correlation peaks, the energy levels of the spot and primary signals.

For example, the current state of a frame will be deduced from the different (current and past) indicator vectors using hidden Markov models (HMM) or Kalman filters. A learning phase may be conducted, for example when repeating the recording) or gradually, the model will improve.

Advantageously, this alternative is more sophisticated and more heavy-duty.

In relation with FIG. 8, we now consider a primary microphone P and two spot microphones A1, A2, arranged in a way to capture a sound scene and describes the steps of a method of mixing these signals according to an aspect of the disclosure.

During step M0, we encode the audio signal picked up by the capsules of the primary microphone in the HOA format. We obtain a signal SP with 4 components, W, X, Y and Z as previously described.

During step M11, we estimate the mixing parameters of the signal SA1 captured by the first spot microphone with the signal SP by implementing the method of estimation according to an aspect of the disclosure just described. We obtain the estimated values of delay $\tilde{\tau}1$, angular position $\tilde{\theta}_1$, $\tilde{\phi}_1$ and of gain $G_1$. The delay value obtained is applied to the signal SA1 during step M21. In this way, it temporally synchronizes the primary signal SP and the spot signal SA1.

For each spot, an aspect of the disclosure provides two modes of resynchronization, depending on the variation in time of the estimated delay and/or certain indices obtained during this estimation. When the estimated delay is stable or evolves continuously of the frame within the frame, it is justified to make a reading with a sliding delay, i.e. to determine for each sample sound to treat a delay obtained by temporal interpolation between the delays estimated for the previous frame and the current frame and to determine the resulting sound sample by interpolation of the signal in the vicinity of the interpolated delay. The interpolation can be carried out according to different techniques, known to the person skilled in the art, as for example the techniques using linear polynomial interpolations or splines as described in the document of R. W. Schafer et al, entitled "A Digital Signal Processing Approach to Interpolation', published in the proceedings IEEE, vol. 61, no. 6, pp. 692-702, in June 1973.

It may be conversely that, from one frame to another, the estimated delay makes a significant jump. This can happen for example when on at least one of the frames the delay is estimated with an error corresponding to an integer number of periods of the signal. This may also occur when the spot signal remained "silent", that is to say at a sound level below a threshold considered significant, over a period during which the sound source primarily captured by the spot is moved while being silent. During this period, the delay has not been updated, up to the time when the source has become audible again. In this case, the updated delay may take a value significantly different from the previous estimate. Or, it may be a new source captured predominantly by the same spot. In these cases, the principle of a sliding delay over the transition period is not appropriate, because it could create an artificial Doppler effect, that is to say a momentary frequency distortion. An aspect of the disclosure provides then, over a period of transition, the intermediate production of two delayed versions of the signal by a parallel reading in the spot signal with two simultaneous delays (two reading pointers), to finally produce a cross-fade signal of the two versions of the delayed signal. In this way, the frequency integrity of the signal is preserved.

During step M31, the level of the delayed spot signal SA1 is adjusted by application of the estimated gain $G_1$.

In M41, it is spatially encoded in the HOA format using the angular position parameters $\tilde{\theta}_1$, $\tilde{\phi}_1$ it is understood that during this step, the spot signal SA1 is spatialized in the referential of the primary microphone. The spatial encoding HOA, in its easiest modality, is based on the use of spherical harmonic functions, with the input of said parameters of angular position, producing amplitude gains to apply to the spot signal to obtain the associated HOA signals. This angular encoding can be completed to translate any other spatial characteristic as the closest field, as described for example in the document entitled "Further study of Sound Field Coding with Higher Order Ambisonics", by J. Daniel and S. Moreau, published in the proceedings of the conference 116th AES Convention in 2004. We thus obtain a representation which is compatible with the captured primary microphone, that is to say, for a 3D representation, with a minimum set of 4 signals $W_{SA1}$, $X_{SA1}$, $y_{ITS1}$ and $Z_{SA1}$ corresponding to order-1. Advantageously, it is naturally possible to encode the spot signal with a spatial resolution (in other words an ambisonic order) greater than that captured by the primary microphone, in order to improve the definition not only audio, but spatial, of sound sources.

In a similar way, we estimate in M12 the mixing parameters of the signal SA2 captured by the second spot microphone with the signal SP by implementing the estimation method according to an aspect of the disclosure just described. We obtain the estimated values of delay $\tilde{\tau}2$, angular position $\tilde{\theta}_{21}$, $\tilde{\phi}_{21}$ and $G_2$. The delay value obtained is applied to the signal SA2 during step M22. In this way, it temporally synchronizes the primary signal and the spot signal.

During step M32, the level of the delayed spot signal SA2 is adjusted by application of the estimated gain.

In M42, it is encoded into the HOA format using the angular position parameters $\tilde{\theta}_2$, $\tilde{\phi}_2$. It is understood that during this step, the delayed spot signal SA2 is spatialized in the referential of the primary microphone, consistent with an "image" of the scene captured by the primary microphone. We therefore obtain a signal with 4 components $W_{SA2}$, $X_{SA2}$, $Y_{SA2}$ et $Z_{SA2}$.

During step M5, the HOA signals are added, component by component to obtain a global signal SG whose 4 components integrate, without artefact, the signals captured by the different microphones.

Advantageously, we can then decode in M6 the global signal SG obtained to reproduce the sound scene spatialized on several loud-speakers.

It should be noted that the aspect of the disclosure just described, can be implemented by means of software components and/or materials. In this context, the terms "module" and "entity", used in this document, may correspond either to a software component, a hardware component, a set of hardware and/or software components, suited to implement the functions described for the module or the entity concerned.

In relation with FIG. 9 we shall now present an example of a simplified structure of a device 100 of estimation of mixing parameters according to an aspect of the disclosure. The device 100 implements the method of estimation of mixing parameters according to the aspect of the disclosure just described in relation with FIG. 5.

For example, the device 100 includes a processing unit 110, equipped with a processor µ1, and controlled by a computer program Pg1 120, stored in a memory 130 and implementing the method according to an aspect of the disclosure.

Upon initialization, the instructions of the code of the computer program $Pg_1$ 120 are for example loaded into a RAM memory, before execution by the processor of the processing unit 110. The processor of the processing unit 110 implements the steps of the method previously described, according to the instructions of the computer program 120.

In this exemplary an aspect of the disclosure, the device 100 includes at least one unit GET for obtaining a frame from a spot signal or a reference signal and a frame from the primary signal or signal of observation, one SELECT unit for selecting a block of reference in the reference signal and an observation area in the frame of observation, a unit EST i for estimating a delay between the block of reference and a block of observation of the frame of observation, one unit EST P for estimating an angular position of the block of reference in a referential of the signal of observation, one unit EST G for estimating the level of gain of the block of reference with respect to a block of observation, a unit CALC ICL for calculating local indices of reliability associated with each of the estimated parameters, from the local estimation for the current block of reference and the estimate for the previous frame, a unit CALC ICG for calculating global indices of reliability associated with the estimated parameters for the reference frame, from the local estimate for the current block of reference and from the estimated previous frame and a unit DET for determining the values of the estimated parameters for the current frame on the basis of the global index of reliability obtained. The units for selecting, estimating and calculating indices of reliability can to be implemented for each block of reference of the frame of reference.

The device 100 includes in addition a unit M1 for storing the estimated parameters for each of the reference frames q of the spot signal.

These units are controlled by the processor µ1 of the processing unit 110.

Advantageously, the device 100 can be integrated with a user terminal UT. It is then arranged to cooperate at least with the following modules of the terminal UT:
  a memory capable of storing the values of estimated parameters for frames q;
  a module E/R for transmission and reception of data, through which it transmits through a computer network of telecommunications, the estimated mixing parameters to a user terminal UT which set said parameters for said module.

In relation to FIG. 10, we shall now present an example of a simplified structure of a device 200 for mixing audio signals representative of a same sound scene and captured by a primary microphone and one or several spot microphones according to an aspect of the disclosure. The device 200 implements the mixing method according to an aspect of the disclosure described in relation to FIG. 7.

For example, the device 200 includes a processing unit 210, equipped with a processor µ2, and controlled by a computer program Pg2 220, stored in a memory 230 and implementing the method according to an aspect of the disclosure.

At the initialization, the code instructions of the computer program $Pg_2$ 220 are for example loaded into a RAM memory, before being executed by the processor of the processing unit 210. The processor of the processing unit 210 implements the steps of the method previously described, according to the instructions of the computer program 220.

In this exemplary an aspect of the disclosure, the device 200 includes at least one unit ENC SP encoding a frame of the primary signal or signal of observation in HOA format, one or several units GET $\tilde{\tau}_1$, $\tilde{\theta}_{n1}$, $\tilde{\phi}_1$, $\tilde{g}_1$, GET $\tilde{\tau}_2$, $\tilde{\theta}_2$, $\tilde{\phi}_2$, $\tilde{g}_2$ of the mixing parameters of the spot signals SA1, SA2, one or several units PROC SA1, PROC SA2 for processing the reference frames so to apply to them the delay and the estimated gain, one or several units ENC SA1, ENC SA2 for spatial encoding of the frames of the reference signals from the spot microphones using the estimated delay between the block of reference and the frame of observation, a unit MIX of mixing of the encoded primary signals and spot fit to provide an encoded global signal SG and a unit DEC SG of decoding global signal in view of a spatialized reproduction of the sound scene on a plurality of speakers.

These units are controlled by the processor µ2 of the processing unit 210.

In a particular embodiment, the sound engineer has the possibility to monitor and possibly adjust the mixing parameters estimated by an aspect of the disclosure. According to first aspect, he may modulate the value of the parameters of delay, gain, spatial positioning HOA upstream of the PROC units of the signals properly speaking, that is to say directly in the output of the estimation unit of the parameters GET, i.e. more downstream, at the level of the processing units PROC themselves, for example through a manual interface for adjusting the parameters INT.

According to first aspect, the units GET implement the estimation method according to the aspect of the disclosure just described. Advantageously, they include an estimation device 100 according to an aspect of the disclosure. In this case, one or more devices 100 are integrated to the mixing device 200 according to an aspect of the disclosure.

According to a first variation, the computer program Pg1 120 is stored in the memory 230. At the initialization, the code instructions of the computer program $Pg_1$ 120 are for example loaded into a RAM memory before execution by the processor of the processing unit 110. According to a second variation, the device 200 is connected to one or more external estimation devices 100, which control the estimation of mixing parameters.

Advantageously, the device 200 can be integrated to a user terminal UT'. It is then arranged to cooperate at least with the following modules of the terminal UT':
- a memory capable of storing the values of estimated parameters and/or the encoded primary and spot signals;
- a module E/R for transmission and reception of data, through which it controls the estimated mixing parameters and/or the encoded signals at the user terminal UT including the device 100 via a telecommunications network;
- a user interface INT through which a user can adjust the values of estimated parameters.

Several applications of the disclosure are envisaged, as well in the professional field as for the general public.

For those skilled in the art, an aspect of the disclosure can be used to implement an automatic assistance during the mixing of multimedia contents. It applies to other contexts than that already described of a musical sound recording with use of higher order ambisonic microphones (HOA) and spot microphones which can be placed alongside musical instruments.

In particular, the theater offers different opportunities for the use of the HOA technology. During sound recording, several solutions are available to place the primary microphone and the spot microphones. For example, it is possible to record an artist in motion with a spot microphone but it would also be possible to place the spot microphones at the edge of the stage to locate his position and his travel.

The cinema opens new prospects for the use of HOA as primary microphone in conjunction with spot microphones. The microphone HOA can also find its place as an ambient microphone.

The ambisonic technology can also be used for the recording of television and radio programs. In this case, a pre-automatic mixing such as that provided by an aspect of the disclosure is particularly advantageous, because most of the transmissions occur in real time, which makes any post-production impossible.

In the domain of the general public, the HOA technology also opens up perspectives:
- HOA can be used during the practice of musical bands. The primary microphone HOA captures the globality of the sound field and the musicians use for example their mobile phones as spot microphones. An aspect of the disclosure automatically provides a pre-mixed practice version which allows musicians to listen to the musical band and to improve practice after practice;
- During an immersive meeting, for example work or family, mobile phones are used as spot microphones and the primary microphone is installed either at the center of the table if there is a spoken meeting or suspended at a certain height during a family meeting. The pre-mixing solution according to an aspect of the disclosure is to combine the signals picked up by all the spot microphones and to mix them with the primary microphone to restore a complete sound image.

An exemplary embodiment of the disclosure proposes a solution that automatically considers the mixing parameters of the signals picked up by one or several spot microphones with a primary "ambisonic" microphone, reliably.

An exemplary embodiment provides a sound engineer with assistance when mixing these signals from the estimated parameters.

It goes without saying that the embodiments described above have been given for indicative purposes only and in no way limiting, that they can be combined and that many of the changes can be easily used by the person skilled in the art without departing from the scope of the disclosure and/or the appended claims.

The invention claimed is:

1. A method comprising the following acts performed by a processing device:
   receiving at least one spot audio signal captured by a sound recording device, called a spot microphone, arranged in the vicinity of a source among a plurality of acoustic sources constituting a sound scene, and a primary audio signal captured by an ambisonic sound recording device, called a primary microphone, arranged to capture said plurality of acoustic sources of the sound scene, said primary audio signal being encoded in a format called "ambisonic", comprising at least one omnidirectional component (W) and three bidirectional components (X, Y, Z) projected along orthogonal axes of a referential of the primary microphone;
   processing the received at least one spot audio signal and the primary audio signal by implementing the following acts, for a frame of the primary audio signal and a frame of said at least one spot audio signal, each frame comprising at least one block of N samples:
   estimating a delay between the omnidirectional component of the frame of the primary audio signal and the frame of said at least one spot audio signal, from at least one block of N samples of one of the two frames, so-called block of reference ($BRef_I$), associated with predetermined moment of acquisition (TI), and an observation area ($ZObs_i$) of the other frame, so-called observation area, including at least one block of N samples and formed in proximity of the moment of acquisition, by maximizing a measurement of similarity between the block of reference and a block of the observation area, so-called block of observation ($BObs_i$), temporally offset by the delay ($\tau$) in relation to the block of reference;
   estimating at least one angular position of the source captured by said spot microphone in the referential of the primary microphone by calculation of ratio between a first scalar material of a block of the at least one spot audio signal associated with the predetermined moment of acquisition and a first bidirectional component of the block of the primary audio signal temporally offset by the estimated delay ($\tau$) and a second scalar material of the same block of said at least one spot audio signal and the block of a second bidirectional component of the primary audio signal temporally offset by the estimated delay ($\tau$); and
   performing an act comprising:
   transmitting the estimated delay and the estimated at least one angular position of the captured source to a mixing device; or
   modifying the at least one spot audio signal according to the estimated delay and the estimated at least one angular position of the captured source to produce at least one modified spot audio signal.

2. The method according to claim 1, wherein, the block of reference ($BRef_i$) being chosen in the at least one spot audio signal, the stage of estimating the delay comprises a calculation of a similarity measurement at least for the block of reference ($BRef_i$), from a normalized cross-correlation function ($C_i$) which is expressed in the following way:

$$C_i(\tau) = \frac{\langle a_n | W \rangle_{-\tau}}{\|a_n\| \cdot \|W\|_{-\tau}}$$

with W(t) omnidirectional component of the ambisonic signal, $a_n(t)$ the at least one spot audio signal, $\langle x|y \rangle_{-\tau} = \langle x|y \rangle_{-\tau}$, the scalar product between the two finite support signals temporally offset by $-\tau$, in the observation area is associated with the block of reference (BRef$_i$), and $\|x\|_\tau = \sqrt{\langle x|x \rangle_\tau}$, the norm of a discrete finite support signal;

and in that the delay ($\tau$) is estimated from the maximum value of the similarity measurement calculated:

$$\tilde{\tau} = \text{Argmax}_\tau C_i(\tau).$$

3. The method according to claim 2 wherein the act of estimating the delay also comprises a temporal smoothing of the similarity measurement calculated for the current block of reference (BRef$_i$) taking into account the similarity measurement calculated for at least one previous block of reference (BRef$_{I-1}$).

4. The method according to claim 2, comprising an act of calculating a local index of reliability associated with a mixed parameter estimated for the block of reference by analysis of the normalized cross-correlation function calculated between the omnidirectional component of the primary audio signal and the at least one spot audio signal and energy from the signal of the block of reference.

5. The method according to claim 4, wherein the local index of reliability associated with the estimated delay parameter is based on a ratio between the values of the primary and secondary peaks, the cross-correlation function multiplied by the energy of the block of reference (BRef$_i$).

6. The method according to claim 4, wherein the local index of reliability associated with the parameter of angular position is based on the maximum value of the cross-correlation associated with the delay ($\tilde{\tau}_i$) estimated and on a ratio between the energy of the block of reference (BRef$_i$) and that of the block of observation (BObs$_i$).

7. The method according to claim 1, wherein the estimation of the at least one angular position of the captured source comprises an estimation of an azimuth angle ($\tilde{\theta}_n$) from a ratio between the scalar material of the signal of the block of reference associated with the predetermined moment of acquisition with the block component Y of the primary audio signal offset by the estimated delay and the scalar product of the signal of the block of reference associated with the predetermined moment of acquisition with the block component X of the primary audio signal offset by the estimated delay.

8. The method according to claim 7, wherein the azimuth angle is estimated from the following equation:

$$\tilde{\theta}_n = a\tan 2(\langle a_n|Y \rangle_{-\tau}, \langle a_n|X \rangle_{-\tau}).$$

9. The method according to claim 1, wherein the estimation of the at least one angular position of the captured source comprises an estimation of an elevation angle from a ratio between the scalar product of the block of reference of the at least one spot audio signal associated with the moment of acquisition with the block component Z of the primary audio signal offset by the estimated delay ($\tau$) and the scalar material of the block of the at least one spot audio signal associated with the moment of acquisition with the block of omnidirectional component of the primary signal offset by the estimated delay ($\tau$).

10. The method according to claim 9, wherein the angle of elevation ($\tilde{\phi}_n$) is estimated from the following equation:

$$\tilde{\varphi}_n = \arcsin\left(\frac{\langle a_n | Z \rangle_{-\tilde{\tau}}}{\eta \cdot \langle a_n | W \rangle_{-\tilde{\tau}}}\right).$$

11. The method according to claim 1, wherein the method also comprises an estimate of a gain parameter from a ratio between the scalar product of the block of the at least one spot audio signal and of the block of the component of the omnidirectional primary audio signal offset by the estimated delay ($\tau$) and the norm of the block of the at least one spot audio signal.

12. The method according to claim 11, wherein the gain parameter is estimated from the following equation:

$$\tilde{g}_{m,n,W} = \frac{\langle a_n | W \rangle_{-\tilde{\tau}}}{\|a_n\|^2}.$$

13. The method according to claim 1, wherein the acts of estimating the delay and the position are repeated for the plurality of blocks of reference (BRef$_I$) of the frame (TRef$_Q$), and the process comprises additionally the acts of calculating of global indices of reliability associated with estimated mixing parameters for the frame of reference, from the local indices calculated for a block of reference of said frame and an act of determining the values of the mixing parameters for a plurality of frames on the basis of the global indices of reliability calculated.

14. A non-transitory computer-readable medium comprising instructions stored thereon, which when executed by a processor of the processing device, configures the processing device to perform the method in claim 1.

15. The method according to claim 1, further comprising
Mixing the at least one spot audio signal and the primary audio signal representative of the same sound scene composed of the plurality of acoustic sources, the at least one spot audio signal being picked up by the spot microphone and the primary audio signal being picked up by the primary microphone, wherein mixing includes performing the act of modifying the at least one spot audio signal, which comprises:
processing the at least one spot audio signal, at least from the estimated delay, to produce at least one delayed spot audio signal;
spatial encoding of said at least one delayed spot audio signal using the at least one estimated angular position of the captured source to produce at least one spatially encoded spot audio signal; and
summing said at least one spatially encoded spot audio signal to the primary ambisonic signal to produce a global ambisonic signal.

16. A non-transitory computer-readable medium comprising instructions stored thereon, which when executed by a processor of the processing device, configures the processing device to perform the method in claim 15.

17. A device comprising:
a non-transitory computer-readable medium comprising instructions stored thereon;
a processor configured by the instructions to perform acts comprising:
receiving at least one spot audio signal captured by a sound recording device, called a spot microphone ($a_n$), arranged in the vicinity of a source among a plurality of acoustic sources constituting a sound scene (Sc), and a primary audio signal (SP) captured by an ambisonic sound recording device (P), called a primary microphone, arranged to capture said plurality of acoustic sources of the sound scene, said primary audio signal being encoded in a format called "ambisonic", comprising at least one component (W) and three omni-directional components (X, Y, Z) projected bidirectionally along orthogonal axes of a referential of the primary microphone, processing the received at least one spot audio signal and primary audio signal by implementing for a frame of the primary audio signal and a frame of said at least one spot audio signal, each frame comprising at least one block of N samples:

estimating (EST $\tau$) a delay ($\tau$) between the omni-directional component of the frame of the primary audio signal and the said frame of said at least one spot audio signal, from a block of N samples of a frame of one of the two audio signals, so-called block of reference, associated with a predetermined moment of acquisition, and an observation area of the frame of the other audio signal, so-called, observation area, comprising at least one block of N samples and formed in close proximity of the moment of acquisition, by maximizing a measurement of similarity between the block of reference and a block in the observation area, so-called block of observation, temporally offset by the delay ($\tau$) with respect to the block of reference;

estimating (EST $\theta$, $\phi$) at least one angular position of the source captured by said spot microphone in the referential of the primary microphone by calculation of a ratio between a first scalar product of a first bidirectional component of the block of the primary audio signal associated with the predetermined moment of acquisition and of a block of the at least one spot audio signal temporally offset by the estimated delay ($\tau$) and a second scalar product of a second bidirectional component of said block of the primary audio signal and the corresponding block of the estimated audio signal temporally offset by the delay (T); and performing an act comprising:
  transmitting the at least one spot audio signal according to the estimated delay and the estimated at least one angular position of the captured source to a mixing device; or
  modifying the at least one spot audio signal according to the estimated delay and the estimated at least one angular position of the captured source to produce at least one modified spot audio signal.

18. A mixing device comprising:
a non-transitory computer-readable medium comprising instructions stored thereon;
a processor configured by the instructions to perform acts comprising:
receiving at least one spot audio signal and a primary audio signal representative of a same sound scene composed of a plurality of acoustic sources, the at least one spot audio signal being picked up by a sound recording device located close to a source and the primary audio signal being picked up by another, ambisonic sound recording device, called a primary microphone and able to capture the plurality of sources, said primary audio signal being encoded in a so-called "ambisonic" format, comprising at least one omni-directional component (W) and three components (X, Y, Z) projected bidirectionally along orthogonal axes of a referential of the primary microphone;
obtaining mixing parameters from the at least one spot audio signal and from the primary audio signal, said parameters comprising at least one estimated delay and at least one estimated angular position;
processing the at least one spot audio signal at least from the at least one estimated delay to produce at least one delayed spot audio signal;
spatial encoding of said at least delayed one spot audio signal delayed from using the at least one estimated angular position to produce at least one spatially encoded spot audio signal; and
summing said at least one spatially encoded spot audio signal with the primary ambisonic signal to produce a global ambisonic signal.

19. A user terminal comprising the mixing device according to claim 18 and at least one device that estimates the mixing parameters.

* * * * *

UNITED STATES PATENT AND TRADEMARK OFFICE
CERTIFICATE OF CORRECTION

PATENT NO. : 9,769,565 B2
APPLICATION NO. : 15/091315
DATED : September 19, 2017
INVENTOR(S) : Andrey Fedosov et al.

It is certified that error appears in the above-identified patent and that said Letters Patent is hereby corrected as shown below:

In the Specification

<u>In the Equations</u>
Column 10, Line 55, please replace Equation (6) with the following:
$$h_{m,W}^{(direct)} = g_{m,W} \cdot \delta(t - \tau_{m,W}) \qquad (6)$$
Column 12, Line 20, please replace Equation (12) with the following:
$$\langle x(t-\tau_1)|y(t-\tau_2)\rangle = {}_{\tau_1}\langle x|y\rangle_{\tau_2} = \int_{-\infty}^{+\infty} x(t-\tau_1)y(t-\tau_2)dt \qquad (12)$$

In the Claims

In Claim 2, Column 29, Line 11, please replace the equation with the following:
$$\|x\|_\tau = \sqrt{{}_\tau\langle x|x\rangle_\tau}$$

In Claim 10, Column 29, Line 67, please remove "($\Phi_n$)" and insert --  --

In Claim 17, Column 31, Line 27, please remove "(EST θ,Φ)" and insert --(EST θ, φ)--

In Claim 17, Column 31, Line 37, please remove "(T)" and insert --($\tau$)--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*